United States Patent
Zhu et al.

(10) Patent No.: US 9,819,901 B1
(45) Date of Patent: Nov. 14, 2017

(54) ADAPTIVE WIRELESS REPEATER FOR NETWORK EXTENSION

(71) Applicant: Amazon Technologies, Inc., Seattle, WA (US)

(72) Inventors: Yi Zhu, San Jose, CA (US); Zhen Xie, San Jose, CA (US); Jin Guo, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 86 days.

(21) Appl. No.: 14/705,038

(22) Filed: May 6, 2015

(51) Int. Cl.
*H04W 72/00* (2009.01)
*H04N 7/10* (2006.01)
*H04N 21/61* (2011.01)
*H04N 21/647* (2011.01)
*H04W 28/02* (2009.01)
*H04W 52/38* (2009.01)

(52) U.S. Cl.
CPC ......... *H04N 7/102* (2013.01); *H04N 21/6125* (2013.01); *H04N 21/6175* (2013.01); *H04N 21/647* (2013.01); *H04W 28/0289* (2013.01); *H04W 52/38* (2013.01)

(58) Field of Classification Search
CPC ............... H04N 7/102; H04N 21/6125; H04N 21/6175; H04N 21/647; H04W 52/38; H04W 28/0289
USPC ......................................................... 455/453
See application file for complete search history.

(56) References Cited

U.S. PATENT DOCUMENTS 8,879,460 B2 * 11/2014 Robertson ............ H04B 7/2606
 370/315
2015/0038136 A1 * 2/2015 Wu ........................ H04W 48/08
 455/434

OTHER PUBLICATIONS

Apple. AirPort base stations: Setting up and configuring an extended wireless network (802.11n). Downloaded from https://support.apple.com/en-us/HT204617 on Jun. 16, 2015.
Papanikos, et al. A Study on Dynamic Load Balance for IEEE 802.11b Wireless LAN. Download from http://www-inst.eecs.berkeley.edu/~ee228a/fa03/228A03/802.11%20wlan/dynamic_load_balancing.pdf on Jun. 16, 2015.

* cited by examiner

*Primary Examiner* — Amancio Gonzalez
(74) *Attorney, Agent, or Firm* — Pierce Atwood LLP

(57) ABSTRACT

Devices, systems and methods are disclosed for enabling a device to act as a wireless extender and adaptively control a transmission power for capability messages. For example, when the device has the capability to relay traffic without affecting a local processing of the device, the device may transmit capability messages at a normal transmission power and may relay traffic between a network device and clients. However, when the device no longer has the capability to relay traffic without affecting the local processing, the device may transmit capability messages at a reduced transmission power. As clients use the capability messages to determine a signal strength of an access point, the reduced transmission power results in the device appearing to have a lower signal strength and thus decreases a desirability of the device as an access point.

16 Claims, 20 Drawing Sheets

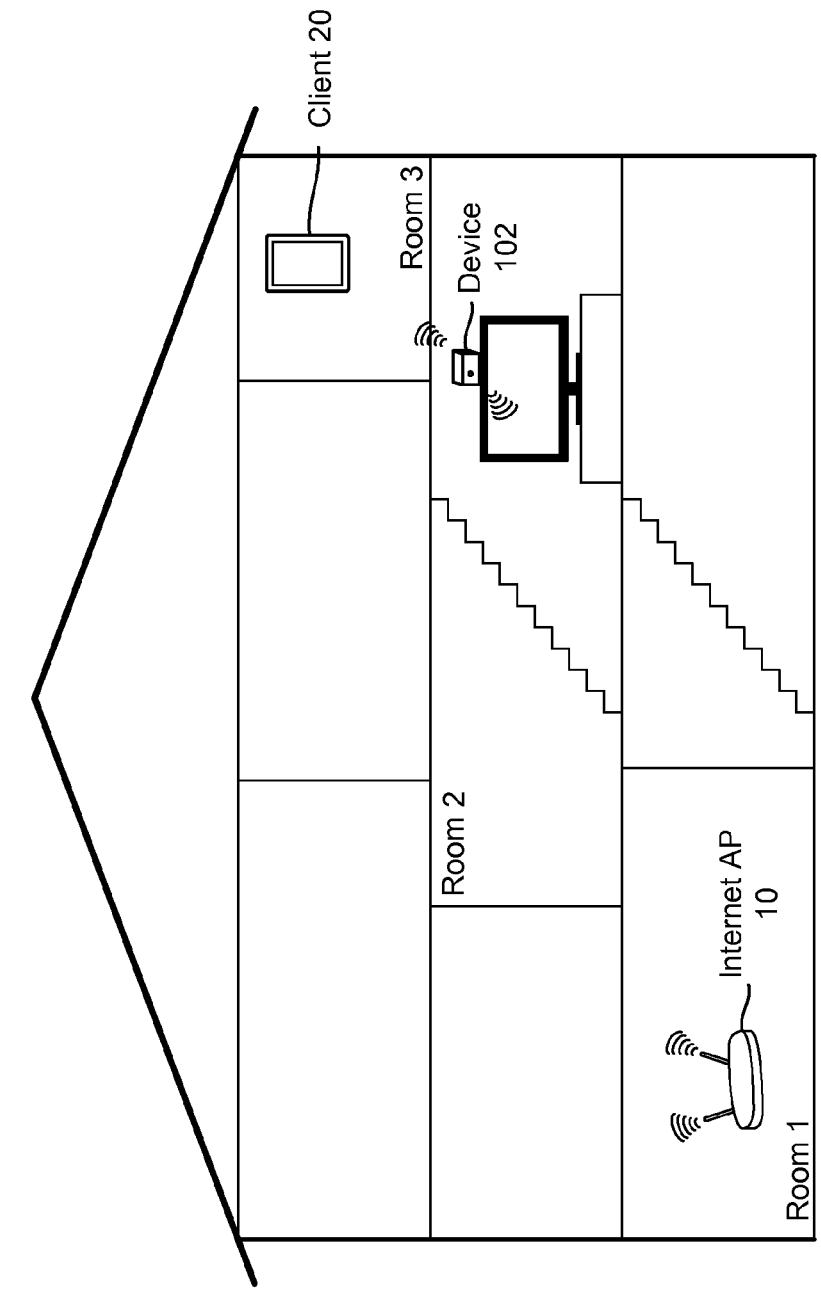

ADAPTIVE WIRELESS REPEATER FOR NETWORK EXTENSION

BACKGROUND

With the advancement of technology, the use and popularity of electronic devices has increased considerably. Electronic devices are commonly used to display digital content that is obtained from networked sources, such as the internet.

BRIEF DESCRIPTION OF DRAWINGS

For a more complete understanding of the present disclosure, reference is now made to the following description taken in conjunction with the accompanying drawings.

FIG. 3A illustrates an example of a home layout with a wireless repeater according to embodiments of the present disclosure.

DETAILED DESCRIPTION

Figure 1:
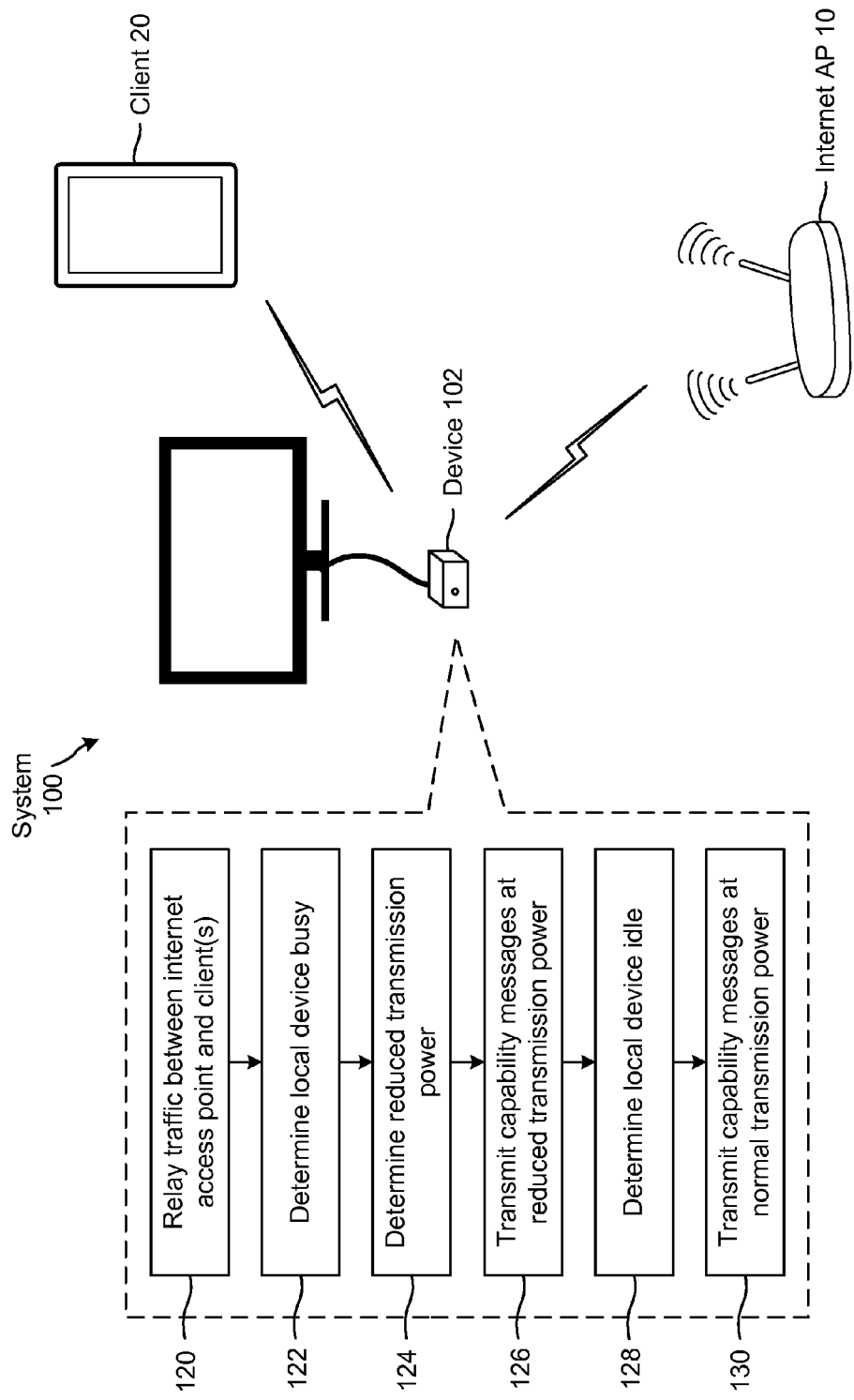
FIG. 1 illustrates an overview of a system for adaptive wireless repeating according to embodiments of the present disclosure.

Electronic devices are increasingly used to display content and access to broader networks, such as the internet, allows devices to access a variety of content. However, wireless networks have a limited range and a network speed may be reduced based on a distance between a device (e.g., a client) and a network device. To increase a range of the network and/or a network speed within the range, network devices can be upgraded or added to the network. For example, a wireless router may be replaced with newer technology, upgraded with an improved high gain antenna or additional network devices (e.g., wired access points or wireless repeaters) may be added to the network. However, these improvements require an additional hardware investment.

To extend a wireless network without an additional hardware investment, existing devices may be configured as a wireless repeater in addition to performing their current local processing. For example, a set-top box, a wireless speaker, a television, or other devices configured to connect to a wireless network may act as a wireless repeater to extend coverage of a network. However, acting as a wireless repeater may increase a processing load of the device and degrade a performance/buffering speed of the device, which may in turn may degrade the experience for users of the device.

To allow the device to act as a wireless repeater without degrading the performance, buffering speed and/or user experience associated with the device, disclosed are techniques for managing when a device acts as a relay for network traffic. A relay-capable device may adaptively communicate its ability to act as a relay based on the processing load for its own (non-relay) tasks. The device communicates this by adaptively controlling a transmission power for messages used to indicate its ability to act as a relay. As described below, such messages may be referred to as capability messages. By controlling the transmission power for the capability messages, the device may adjust its desirability as an access point to clients within range of the device. For example, when the device is idle or has a low processing load, the device may have the capability to relay traffic between a wireless network and clients. In such situations, the device may transmit the capability messages at a normal transmission power and clients may connect to the wireless network through the device, thus extending a range and/or improving a network speed of the wireless network. However, when the device is busy (e.g., has a high processing load, is being used by a user, or is otherwise occupied), the device may not have the capability to relay traffic without affecting its performance. In these situations, the device may transmit the capability messages at a reduced transmission power. A potential client device may detect the reduced transmit power and determine that the device would be an insufficient relay for the client's needs, thus directing the client to connect to the wireless network using a different access point. When the device is idle again (or otherwise again capable of relaying data), the device can increase the transmission power for capability messages so that potential clients will then consider connecting to the wireless network using the device.

FIG. 1 illustrates an overview of a system 100 for implementing embodiments of the disclosure. The system 100 includes an internet access point (AP) 10 (e.g., a wireless router, a cable modem or other network device), a client 20 (e.g., a tablet computer or other client device) and a device 102 (e.g., a set-top box, television or other electronic device configured to act as a wireless extender/repeater, hereinafter "extender"). While FIG. 1 illustrates the internet AP 10 as a wireless router, the disclosure is not limited thereto and the internet AP 10 may be any network device connected to the internet, such as a cable modem, a local area network (LAN) extender or the like. Similarly, while FIG. 1 illustrates the client 20 as a tablet device, the disclosure is not limited thereto and the client 20 may be any electronic device configured to access the network.

As illustrated in FIG. 1, the device 102 may relay traffic between the internet access point 10 and the client 20. While FIG. 1 illustrates the device 102 as a set-top box connected to a television, the present disclosure is not limited thereto and the device 102 may be any electronic device including a processor and configured to act as a wireless extender, including built in to the television, or a different kind of plug-in portable "headless" device without a built in display that receives image signals and sends them to a separate device for display. Further, to enable wireless extension without requiring a dedicated wireless extender, the device 102 may be any Alternator Current (AC) powered wireless-enabled device, including devices not current configured to be wireless repeaters, such as a set-top box, wireless speaker or the like. In order to balance typical usage of the device 102 with relaying traffic by the device 102, the device 102 may adaptively control a transmission power of the device 102 to decrease a signal strength associated with the device 102 (i.e., reduce a desirability of the device 102 as an access point) when the device 102 is busy. As a result, without necessarily modifying a configuration of the client 20, the device 102 may influence the client 20 to disconnect from the device 102 when the device 102 is busy and reconnect to the device 102 when the device 102 is idle.

For example, when the device 102 is idle the device 102 may relay traffic (e.g., data packets) between the internet AP 10 and the client 20 without affecting a performance of the device 102. However, if the device 102 is busy performing local processing (e.g., displaying content, downloading and/or streaming video or gaming content or the like unrelated to client 20), relaying traffic between the internet AP 10 and the client 20 may affect the performance of the device. Therefore, the device 102 may need to prioritize the local processing at the expense of relaying traffic to the client 20. In order to efficiently prioritize the local processing of the device 102 without affecting the client 20, the device 102 may influence the client 20 to disconnect from the device 102 by appearing to be an undesirable access point, such as by adaptively controlling a transmission power for capability messages. For example, the device 102 may use a normal transmission power when transmitting data traffic (e.g., data frames) while using a reduced transmission power to transmit capability messages. Using Institute of Electrical and Electronics Engineers (IEEE) 802.11 specifications in a wireless local area network (WLAN) to illustrate an example, capability messages may include beacon frames and probe response frames, as discussed in greater detail below. By reducing a transmission power for the capability messages (e.g., beacon frames and probe response frames), the client 20 may associate the device 102 with the artificially reduced signal strength (compared to a normal signal strength associated with normal transmission power) and may connect to a different access point, such as the internet AP 10.

As illustrated in FIG. 1, the device 102 may relay traffic (120) between the internet AP 10 and client(s), such as the client 20. For example, the device 102 may be configured as a wireless extender and may relay traffic, including signals, data frames, data packets and the like, between the internet AP 10 and the client 20. As discussed above, the device 102 may be any AC powered wireless enabled device, including devices not currently configured as a wireless repeater. The device 102 may be configured as a wireless repeater using methods known to one of skill in the art. For example, for layer 2 solutions using IEEE 802.11 specifications, a 4-address (destination address (DA), source address (SA), receiver address (RA) and transmitter address (TA)) implementation can be used to relay data by including a "next hop," a current sender, a final destination and an initial source address(es). To enable legacy devices without 4-address support, the device 102 may use ProxySTA (e.g., proxy station (STA)) to provide layer 2 media access control (MAC) address translation in order to forward frames. For layer 3 solutions, the device 102 can use network address translation (NAT) to forward Transmission Control Protocol/Internet Protocol (TCP/IP) traffic between the client 20 and the internet AP 10. The disclosure is not limited thereto and the device 102 may use any network extension or wireless repeating methods known to one of skill in the art.

The device 102 may determine (122) that the device 102 is busy. For example, the device 102 may determine that a display associated with the device 102 is on, that the device 102 is receiving inputs from a user, that the device 102 is downloading data and/or streaming content, that a processing load of the device 102 exceeds a threshold (e.g., that a central processing unit (CPU) usage and/or a data throughput intended for the device 102 exceeds a threshold) or the like.

The device 102 may determine (124) a reduced transmission power. As will be discussed in greater detail below, the device 102 may determine the reduced transmission power based on a first processing load of the device 102 (such as local data consumption), a second processing load associated with relayed traffic (such as to client 20), a difference between a signal strength of the device 102 and a competing access point as detected by the client 20, or some other technique. In addition, the device 102 may determine the reduced transmission power over time. For example, the device 102 may reduce the transmission power in intervals until client(s) disconnect or the second processing load is below a threshold and determine the current transmission power as the reduced transmission power. Further, the device 102 may determine the reduced transmission power based on previous results. For example, the device 102 may reduce the transmission power in a series of intervals at a first time to determine when the client(s) disconnect from the device 102, may store the current transmission power as the reduced transmission power and use the reduced transmission power at a second time after the first time.

The device 102 may transmit (126) capability messages at the reduced transmission power. Thus, the device 102 may use a first transmission power (e.g., normal transmission power) for data traffic (e.g., data frames) and a second transmission power (e.g., reduced transmission power) for the capability messages (e.g., beacon frames and probe response frames). For example, the device 102 may determine a desired transmission power (e.g., Tx descriptor) for each beacon frame or probe response frame and may send the desired transmission power along with the beacon frame or probe response frame from a wireless device driver within the device 102 to transmitter hardware within the device 102 to instruct the transmitter hardware to transmit the beacon frame or probe response frame at the desired transmission power. The exact implementation of including a per-packet attribute with the beacon frame or the probe response frame, such as instructing the transmitter hardware to transmit at the desired transmission power, may vary.

In one example, the device 102 may associate a single frame with multiple headers, including a different header for each layer in the seven-layer Open Systems Interconnection model (OSI Model) of computer networking. As IEEE 802.11 specifications include physical layer (PHY) specifications from Layer 1 (Physical layer) and media access control (MAC) protocol from Layer 2 (Data link layer), the device 102 may include the transmission power in a header associated with an upper layer (e.g., Layer 3 (Network layer) or higher). For example, the device 102 may set a particular bit in a network layer header or higher associated with the beacon frame or probe response frame prior to transmitting the beacon frame or probe response frame. By setting the particular bit, the device 102 may identify that the capability message is to be transmitted at the reduced transmission power and/or identify the reduced transmission power. For example, the device 102 may determine a per packet transmission power and may set an individual transmission power for individual frames by setting the bit in the upper layer header associated with the capability message(s). The upper layer header may include a per-packet attribute (e.g., transmission power) associated with the beacon frame or probe response frame and the header may be sent along with the beacon frame or probe response frame from the wireless device driver of the device 102 to the transmitter hardware within the device 102. However, the transmitter hardware only transmits the beacon frame or probe response frame over the air. Thus, the per-packet attribute and other information contained in the upper layer header are not included in the beacon frame or probe response frame and are therefore internal to the device 102.

Using the per-packet attribute associated with each frame, the device 102 may transmit data frames at a normal transmission power, capability messages to first client(s) at a first reduced transmission power and capability messages to second client(s) at a second reduced transmission power. Alternatively, the device 102 may set a transmission power for the capability messages using any methods known to one of skill in the art without departing from the present disclosure.

The device 102 may determine (128) that the local device is idle and may transmit (130) the capability messages at normal transmission power. For example, the device 102 may determine that the display of the device 102 is off, that a time duration from a last received input from a user exceeds a threshold, that the device 102 is not currently downloading data and/or streaming content, that a processing load of the device 102 is below a threshold (e.g., that a central processing unit (CPU) usage and/or a data throughput intended for the device 102 is below a threshold) or the like.

Using steps 122-126, the device 102 may influence client(s) to disconnect from the device 102 and connect to another access point having a higher detected signal strength. By removing a processing load associated with the client(s), the device 102 may prioritize a local processing (e.g., displaying content, downloading and/or streaming video or gaming content or the like) and improve a performance of the device 102. Using steps 128-130, the device 102 may determine that the device 102 has the capability to again act as a wireless extender and may transmit capability messages at normal transmission power, which may result in client(s) disconnecting from other access points and connecting to the device 102 due to the higher signal strength associated with the device 102.

As used herein, "processing load" may refer to processing and/or throughput restrictions that affect a performance, image quality, buffering speed and/or user experience of the device 102. For example, the device 102 may have a finite processing capability and a finite bandwidth capability. The finite processing capability may be a maximum amount of processing power available to the device 102 based on hardware characteristics of the device 102, while the finite bandwidth capability may be a maximum amount of bandwidth available to the device 102 based on the hardware characteristics of the device and/or network characteristics.

As a first example, the maximum processing power available to the device 102 may be based on an amount of memory and a number/speed of processors available to the device 102. The local processing of the device 102 (e.g., displaying content, downloading and/or streaming video or gaming content or the like) may result in a first processing load having first processing usage (e.g., CPU usage), such as a workload, while relaying traffic (e.g., relaying data packets between the internet AP 10 and the client 20) may result in a second processing load having second processing usage (e.g., CPU usage). As the device 102 nears the finite processing capability, performance of the device 102 may be reduced.

As a second example, the maximum amount of bandwidth available to the device 102 may be based on network components within the device 102 or a fixed bandwidth/speed of network devices connected to the device 102. The local processing of the device 102 (e.g., displaying content, downloading and/or streaming video or gaming content or the like) may result in a first processing load having first throughput (e.g., amount of data used), such as video streaming traffic, while relaying traffic (e.g., relaying data packets between the internet AP 10 and the client 20) may result in a second processing load having second throughput. As the device 102 nears the finite bandwidth capability, performance of the device 102 may be reduced.

To avoid affecting the performance of the device 102, the device 102 may determine when to emphasize a local performance of the device 102 and may influence the client 20 to disconnect from the device 102, thus removing the second processing load. For example, the device 102 may determine that a display of the device 102 is on, that the device 102 is receiving inputs from a user, that the device 102 is downloading data and/or streaming content, when a sum of the first processing load (e.g., first CPU usage) and the second processing load (e.g., second CPU usage) near the finite processing capability, when a sum of the first processing load (e.g., first throughput) and the second processing load (e.g., second throughput) near the finite bandwidth capability, when the first processing load (e.g., first CPU usage and/or first throughput) exceeds a first threshold, when the second processing load (e.g., second CPU usage and/or second throughput) exceeds a second threshold, and/or any combination thereof.

For ease of explanation, the term "capability messages" may be used in reference to messages from the device 102 that the client 20 uses to determine a signal strength of the device 102, or otherwise determines the device's ability to act as a relay for data traffic between the client 20 and another device (such as internet AP 10). Using IEEE 802.11 specifications as an example, network traffic may include management frames (including capability messages), control frames and data frames. Management frames enable stations (e.g., the internet AP 10, the client 20 and the device 102) to establish and maintain communications, control frames assist in the delivery of data frames between stations and data frames transport data packets from higher layers, such as web pages, printer control data, etc., within the body of the data frame. Using IEEE 802.11 specifications, capability messages are a subset of management frames used for client authentication, association and synchronization and are separate from data traffic (e.g., data frames including data packets).

Continuing to use IEEE 802.11 specifications as an example, capability messages may include beacon frames, probe response frames or the like. For example, access points (e.g., the internet AP 10, the device 102 or the like) may transmit a beacon frame periodically to announce the presence of the access point and to relay information, such as a timestamp, service set identification (SSID), basic service set identification (BSSID) and other parameters regarding the access point to clients within range, such as the client 20. Periodically, the client 20 may passively scan 802.11 radio channels and listen to beacon frames in each channel as the basis for choosing which access point to associate with. To connect to a particular access point (e.g., an access point associated with a beacon frame having the strongest signal strength received by the client 20), the client 20 may transmit a probe request frame to obtain information from the particular access point and the particular access point may transmit a probe response frame including capability information, supported data rates and other information in response to the probe request frame. The client 20 may use the beacon frames and/or the probe response frames to determine connection characteristics associated with each access point (e.g., signal strengths or other metrics), and the client 20 may select a particular access point having the best connection characteristics. For example, the client 20 may use the beacon frames and/or the probe response frames to determine a received signal strength indicator (RSSI), which is a measurement of the power present in a radio signal received by the client 20, or a signal to noise ratio (SNR). While signal strengths are illustrated using RSSI, the disclosure is not limited thereto and signal strengths may be determined using SNR without departing from the present disclosure. Thus, to influence the client 20 to connect to a different access point, the device 102 may reduce a transmission power for capability messages (e.g., beacon frames and probe response frames) that the client 20 uses to determine the signal strength of the device 102. However, while IEEE 802.11 specifications are used to illustrate an example, the disclosure is not limited thereto and the capability messages may include any signals and/or messages that the client 20 uses to determine a signal strength of the device 102.

For ease of explanation, the client 20 is connected to the device 102 when the client 20 connects to the network using the device 102, for example when the device 102 relays data packets between the internet AP 10 and the client 20. The device 102 may reduce a transmission power for capability messages prior to the client 20 connecting to the device 102 or while the client 20 is connected to the device 102. When the device 102 reduces a transmission power for capability messages, the client 20 may determine that a first signal strength associated with the device 102 is lower than a second signal strength associated with a neighboring access point, such as the internet AP 10, and therefore connect to the neighboring access point.

Whereas capability messages (and other management frames) are used to establish and/or maintain a connection between client(s) and/or access point(s), data traffic includes the data packets transmitted between the client(s) and/or access point(s) using the connection. While the client 20 is connected to the device 102, the device 102 may continue transmitting data traffic (e.g., relaying data packets between the internet AP 10 and the client 20) at normal transmission power while transmitting the capability messages at a reduced transmission power. Transmitting the data traffic at the normal transmission power while transmitting the capability messages at the reduced transmission power influences the client 20 to connect to the neighboring access point without interfering with transmission of the data traffic. For example, if the device 102 transmits data frames at a reduced transmission power, the client 20 may not receive a portion of the data frames and the device 102 may have to retransmit the data frames that were not received by the client 20, increasing a processing load on the device 102. This would generally be undesirable. However, the present disclosure is not limited thereto and the device 102 may reduce a transmission power for data traffic and the capability messages without departing from the present disclosure.

SSIDs are unique identifiers used to identify a network (e.g., WLAN) that the client 20 can connect to using an access point. BSSIDs are unique identifiers used to identify access points (e.g., the internet AP 10, the device 102, etc.). Thus, the client 20 can detect multiple networks (e.g., SSIDs) having multiple access points (e.g., BSSIDs) and the client 20 may connect to a particular network (e.g., SSID) by connecting to a particular access point (e.g., BSSID) associated with the network. To allow the client 20 to roam amongst access points associated with the particular SSID, the SSID and wireless credentials (e.g., WEP, WPA/WPA2 or the like) of the access points must be the same. For example the device 102 must have the same SSID and wireless credentials as the internet AP 10. However, the client 20 typically connects to the access point within the network having a highest signal strength (e.g., RSSI), which may vary based on a location of the client 20. For example, if the client 20 moves from a first room to a second room, the client 20 may disconnect from a first access point and reconnect to a second access point as the client 20 detects that a first signal strength associated with the first access point is lower than a second signal strength associated with the second access point. Thus, users are typically unaware of the access point and are only aware of the network with which they are connected. To clearly illustrate how the device 102 may influence the client 20, some of the following drawings may itemize unique access points (BSSIDs) detected by the client 20, including associated signal strengths (e.g., RSSIs) and respective networks (SSIDs), information which may not be visible to a user of the client 20.

For ease of illustration, dBm values corresponding to RSSI values are illustrated in the following drawings. For example, the RSSI value may be an integer with an allowable range of 0-255, depending on which wireless vendor manufactures the client 20. The RSSI value used internally by the client 20 may be mapped to dBm using a table. As the integer value may vary depending on vendor, the present disclosure refers to a dBm measurement instead of using the actual RSSI value. Generally, signal strength may be measured using units of mW (milliwats), dBm ("dB"-milliwats), RSSI and/or a percentage measurement. In addition, a signal to noise ratio (SNR) may be a unitless ratio measured in dB.

Figure 2A:
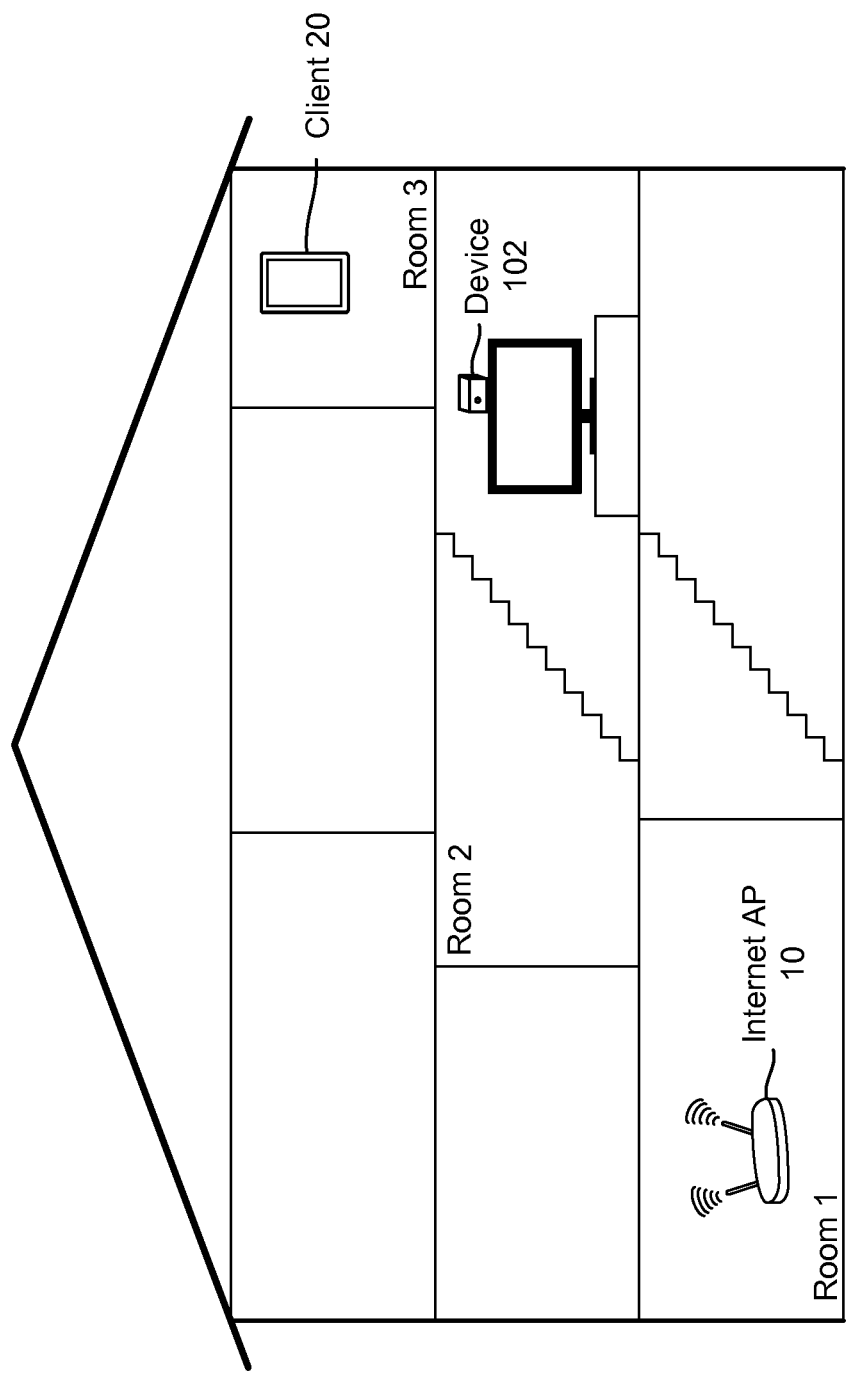
FIG. 2A illustrates an example of a home layout without a wireless repeater.
Figure 2B:
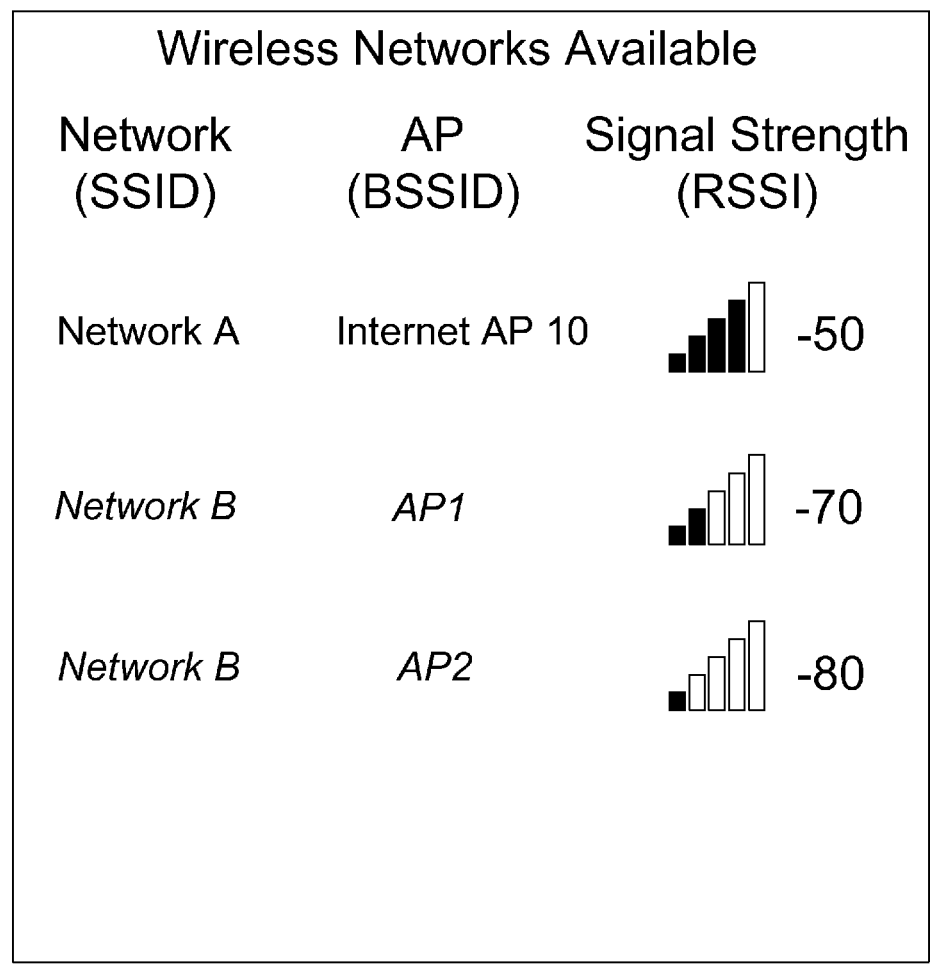
FIG. 2B illustrates an example of access points detected by a client.
Figure 2C:
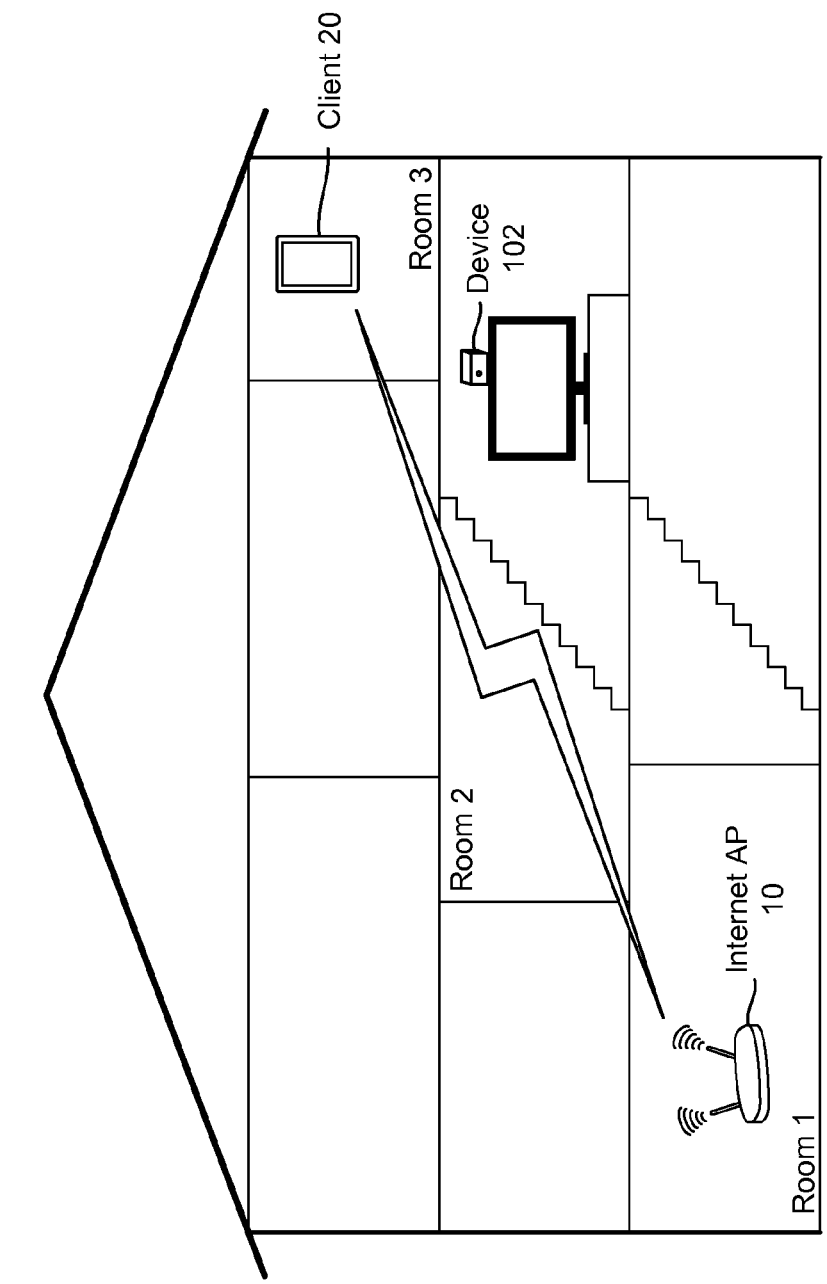
FIG. 2C illustrates an example network configuration without a wireless repeater.

FIGS. 2A-2C illustrate an example of connecting a client 20 to a network when the device 102 is not yet configured as a wireless repeater. As illustrated in FIG. 2A, an internet access point (AP) 10 is located in Room 1, the device 102 is located in Room 2 and the client 20 is located in Room 3. The client 20 detects signals originating from access points within range of the client 20. FIG. 2B illustrates an example list of unique access points (e.g., BSSIDs) detected by the client 20, including associated signal strengths (e.g., RSSIs) and respective networks (e.g., SSIDs). As illustrated in FIG.

2B, the client 20 may detect the internet AP 10, which is associated with Network A, along with a first access point (AP1) and a second access point (AP2) associated with Network B. If the client 20 is configured to connect to Network A, the client 20 may determine that the internet AP 10 has the strongest signal strength associated with Network A, as the client 20 detects a signal strength of 4 bars or −50 dBm for the internet AP 10, and the client 20 may therefore connect to the internet AP 10, as illustrated in FIG. 2C.

While the client 20 is configured to connect to Network A, FIG. 2B includes AP1 and AP2 to illustrate that multiple networks (e.g., Network A and Network B) may coexist and that the client 20 may connect to whichever network with which the client 20 has authentication credentials. If the client 20 was configured to connect to Network B, the client 20 would connect to AP1 as the signal strength associated with AP1 (2 bars or −70 dBm) is greater than the signal strength associated with AP2 (1 bar or −80 dBm). While not illustrated herein, the client 20 may be configured to connect to multiple networks without departing from the present disclosure. For example, the client 20 may be configured to connect to either Network A or Network B. Thus, the client 20 may have authentication credentials for both Network A and Network B and may be configured to connect to the access point having the highest signal strength associated with either network. Using the signal strengths illustrated in FIG. 2B, the client 20 would still connect to the internet AP 10 as the signal strength associated with the internet AP 10 (4 bars or −50 dBm) exceeds the signal strengths associated with AP1 and AP2.

Figure 3B:
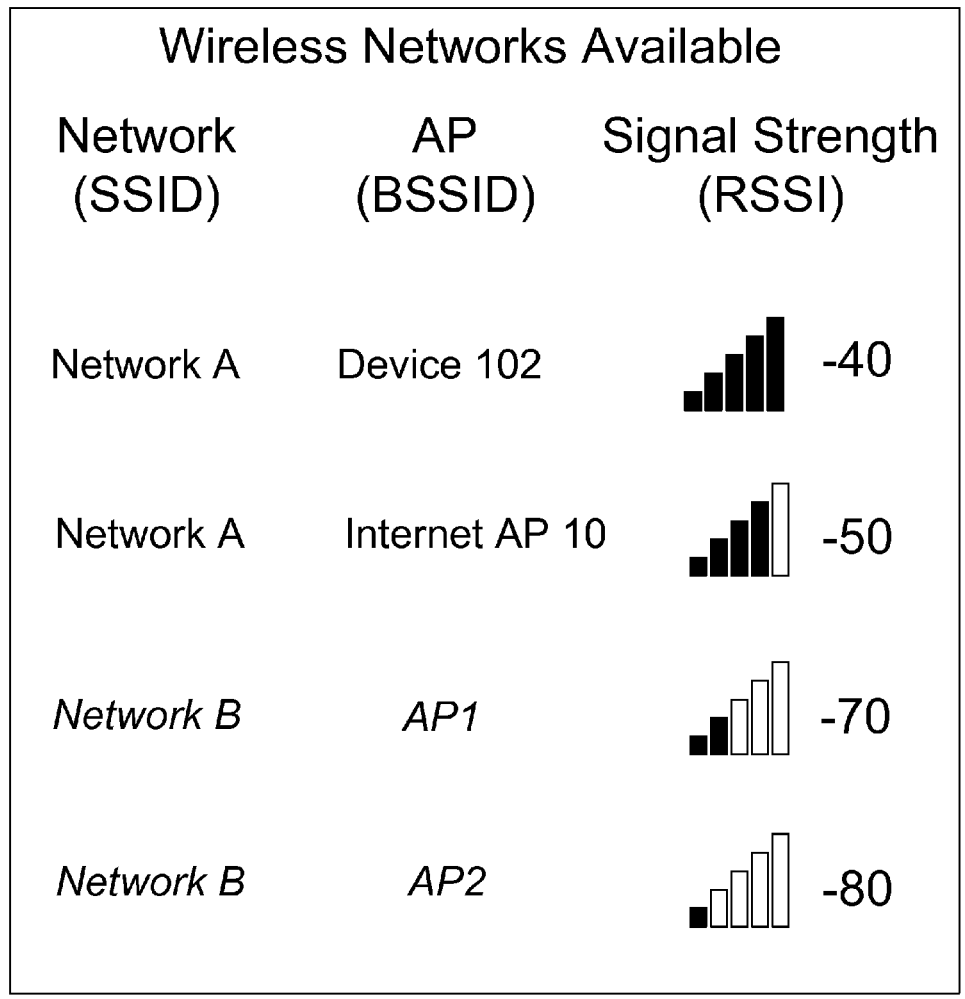
FIG. 3B illustrates an example of access points detected by a client according to embodiments of the present disclosure.
Figure 3C:
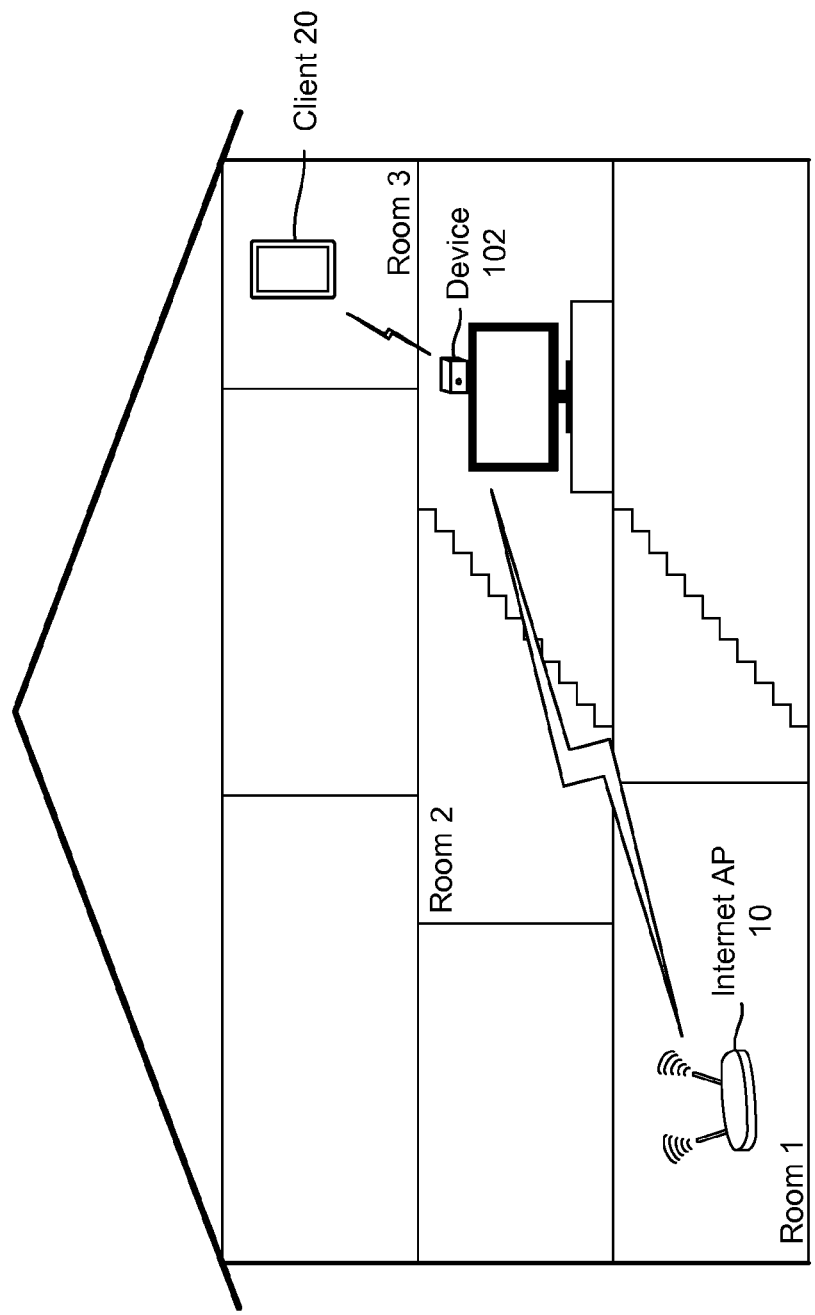
FIG. 3C illustrates an example network configuration with a wireless repeater according to embodiments of the present disclosure.

FIGS. 3A-3C illustrate an example of connecting a client 20 to a network when the device 102 is configured to act as a wireless repeater, according to embodiments of the present disclosure. As illustrated in FIG. 3A, an internet access point (AP) 10 is located in Room 1, the device 102 is configured as a wireless repeater and located in Room 2 and client 20 is located in Room 3. The client 20 detects signals originating from access points within range of the client 20. FIG. 3B illustrates an example list of unique access points (e.g., BSSIDs) detected by the client 20, including associated signal strengths (e.g., RSSIs) and respective networks (e.g., SSIDs). As illustrated in FIG. 3B, the client 20 may detect the device 102 and the internet AP 10, which are associated with Network A, along with a first access point (AP1) and a second access point (AP2) associated with Network B. As the device 102 is located closer to the client 20, the client 20 may detect that a first signal strength associated with the device 102 (e.g., 5 bars or −40 dBm) is greater than a second signal strength associated with the internet AP 10 (e.g., 4 bars or −50 dBm). If the client 20 is configured to connect to Network A, the client 20 may determine that the device 102 has the strongest signal strength associated with Network A and may therefore connect to the device 102, as illustrated in FIG. 3C.

When the device 102 is otherwise idle (or operating a sufficiently low processing load), the device 102 may relay traffic (e.g., data packets) between the internet AP 10 and the client 20 without affecting a performance of the device 102. However, if the device 102 is busy performing local processing (e.g., displaying content, downloading and/or streaming video or gaming content or the like), relaying traffic between the internet AP 10 and the client 20 may affect the performance of the device 102. In such situations, the device 102 may need to prioritize the local processing at the expense of relaying traffic to the client 20. In order to efficiently prioritize the local processing of the device 102 without affecting the client 20, the device 102 may influence the client 20 to disconnect from the device 102 by appearing to be an undesirable access point, such as by adaptively controlling a transmission power for capability messages. For example, the device 102 may use a normal transmission power when transmitting data traffic (e.g., data frames) while using a reduced transmission power to transmit capability messages (e.g., beacon frames and probe response frames). By reducing a transmission power for the capability messages, the client 20 may associate the device 102 with an artificially reduced signal strength (compared to a normal signal strength associated with normal transmission power) and may connect to a different access point, such as the internet AP 10.

Figure 4A:
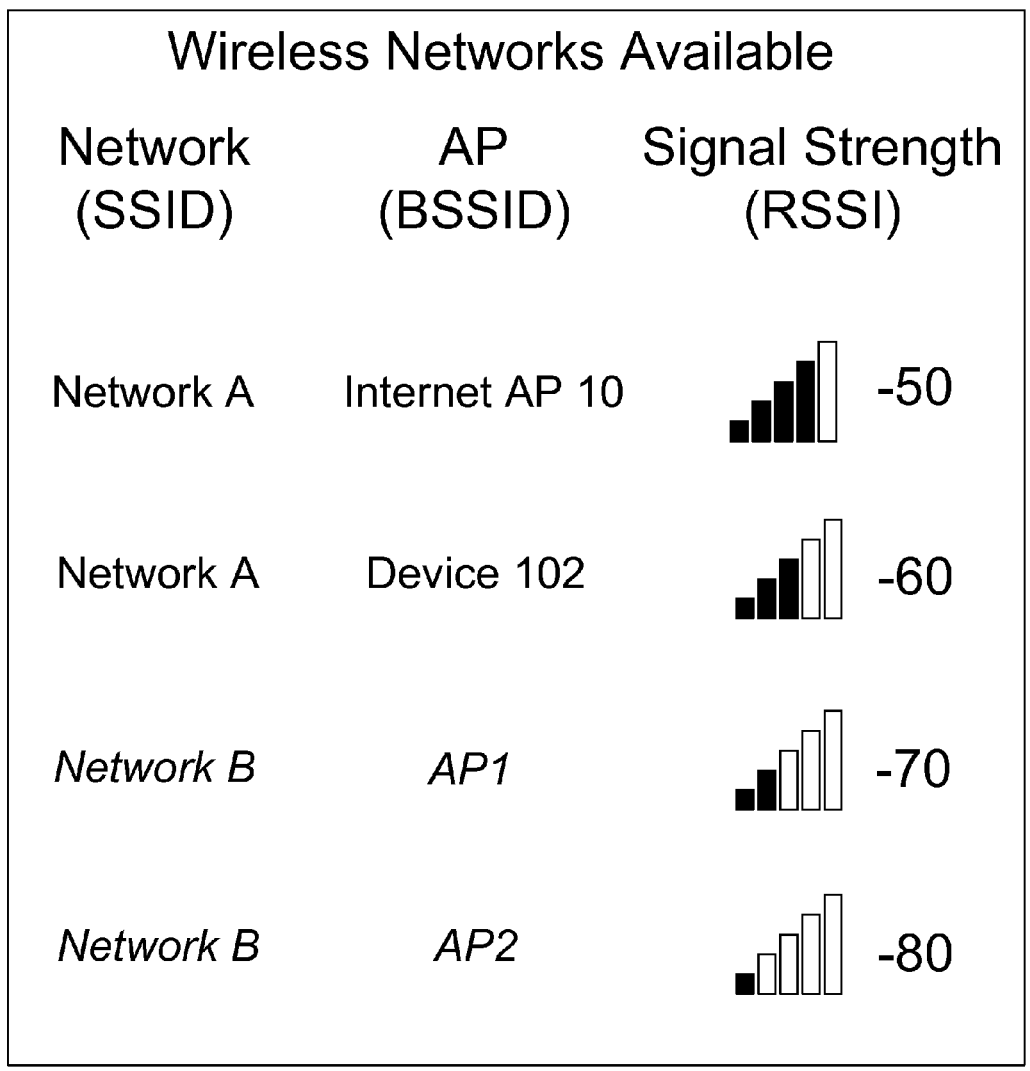
FIG. 4A illustrates an example of access points detected by a client when the wireless repeater is busy, according to embodiments of the present disclosure.
Figure 4B:
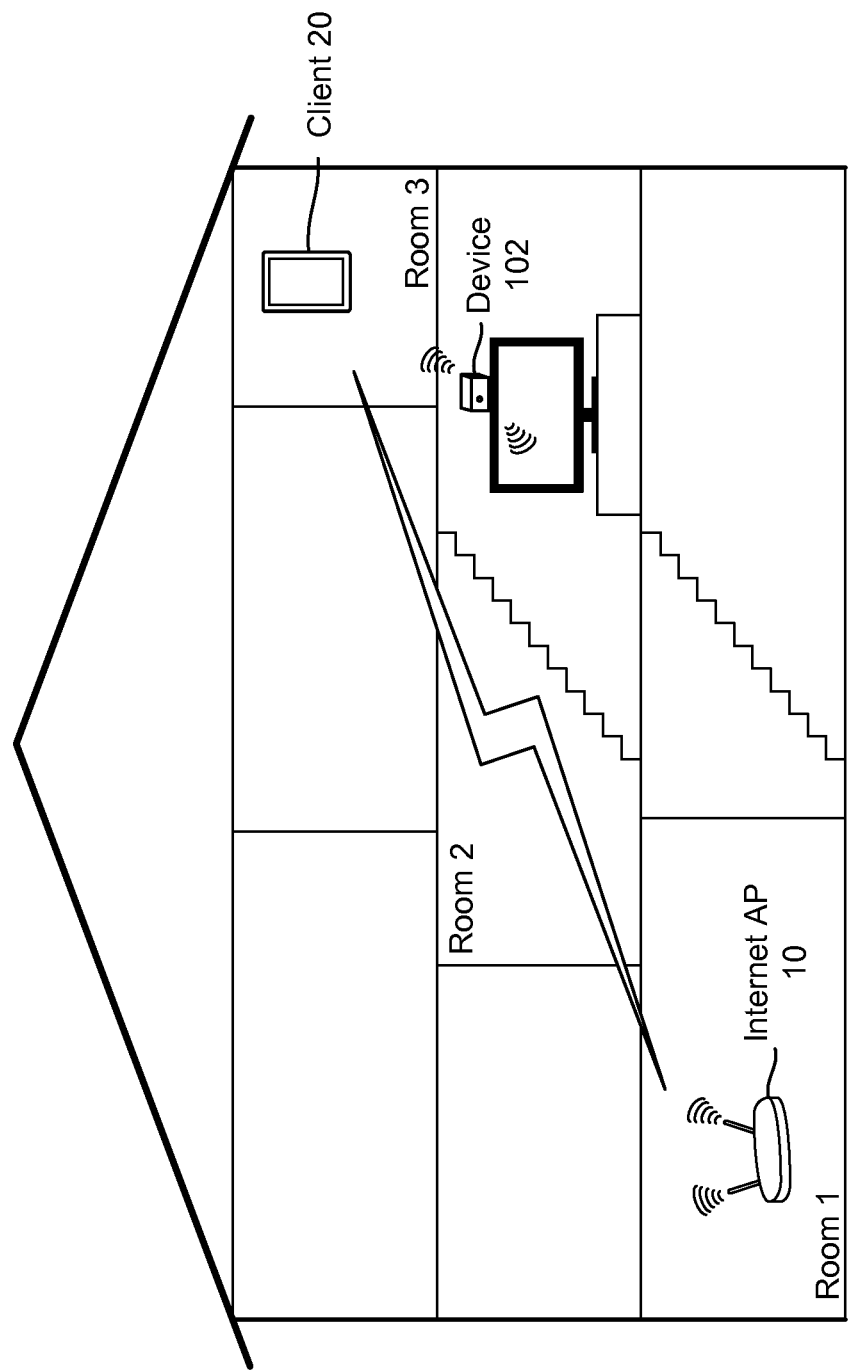
FIG. 4B illustrates an example network configuration when the wireless repeater is busy, according to embodiments of the present disclosure.

FIG. 4A illustrates an example list of unique access points (e.g., BSSIDs) detected by the client 20 when the device 102 is busy, including associated signal strengths (e.g., RSSIs) and respective networks (e.g., SSIDs). As illustrated in FIG. 4A, the client 20 may detect the device 102 and the internet AP 10, which are associated with Network A, along with a first access point (AP1) and a second access point (AP2) associated with Network B. As the device 102 is reducing a transmission power for the capability messages, a first signal strength associated with the device 102 (e.g., 3 bars or −60 dBm) is now less than a second signal strength associated with the internet AP 10 (e.g., 4 bars or −50 dBm). If the client 20 is configured to connect to Network A, the client 20 may determine that the internet AP 10 now has the strongest signal strength associated with Network A, despite the device 102 being physically closer, and therefore the client 20 may disconnect from the device 102 and connect to the internet AP 10, as illustrated in FIG. 4B.

While the client 20 is configured to connect to Network A, FIG. 4A includes AP1 and AP2 to illustrate that multiple networks (e.g., Network A and Network B) may coexist and that the client 20 may connect to whichever network with which the client 20 has authentication credentials. If the client 20 was configured to connect to Network B, the client 20 would connect to AP1 as the signal strength associated with AP1 (2 bars or −70 dBm) is greater than the signal strength associated with AP2 (1 bar or −80 dBm). While not illustrated herein, the client 20 may be configured to connect to multiple networks without departing from the present disclosure. For example, the client 20 may be configured to connect to either Network A or Network B. Thus, the client 20 may have authentication credentials for both Network A and Network B and may be configured to connect to the access point having the highest signal strength associated with either network. Using the signal strengths illustrated in FIG. 4A, the client 20 would still connect to the internet AP 10 as the signal strength associated with the internet AP 10 (4 bars or −50 dBm) exceeds the signal strengths associated with AP1 and AP2. However, if a third access point (AP3, not shown) associated with Network B had a signal strength of −40 dBm, the client 20 would disconnect from the device 102 and connect to AP3, switching from Network A to Network B, as a signal strength associated with AP3 (4 bars or −40 dBm) would exceed a signal strength associated with the internet AP 10 (4 bars or −50 dBm).

When the device 102 is idle again, the device 102 may have the capacity to relay traffic between the internet AP 10 and the client 20 without affecting performance of the device 102. Therefore, the device 102 may increase a transmission power for capability messages (e.g., beacon frames and probe response frames) back to normal transmission power. For example, the device 102 may increase the transmission power for capability messages from the reduced transmission power illustrated in FIG. 4A (e.g., three bars or −60 dBm) back to the normal transmission power illustrated in FIG. 3B (e.g., five bars or −40 dBm).

Figure 5A:
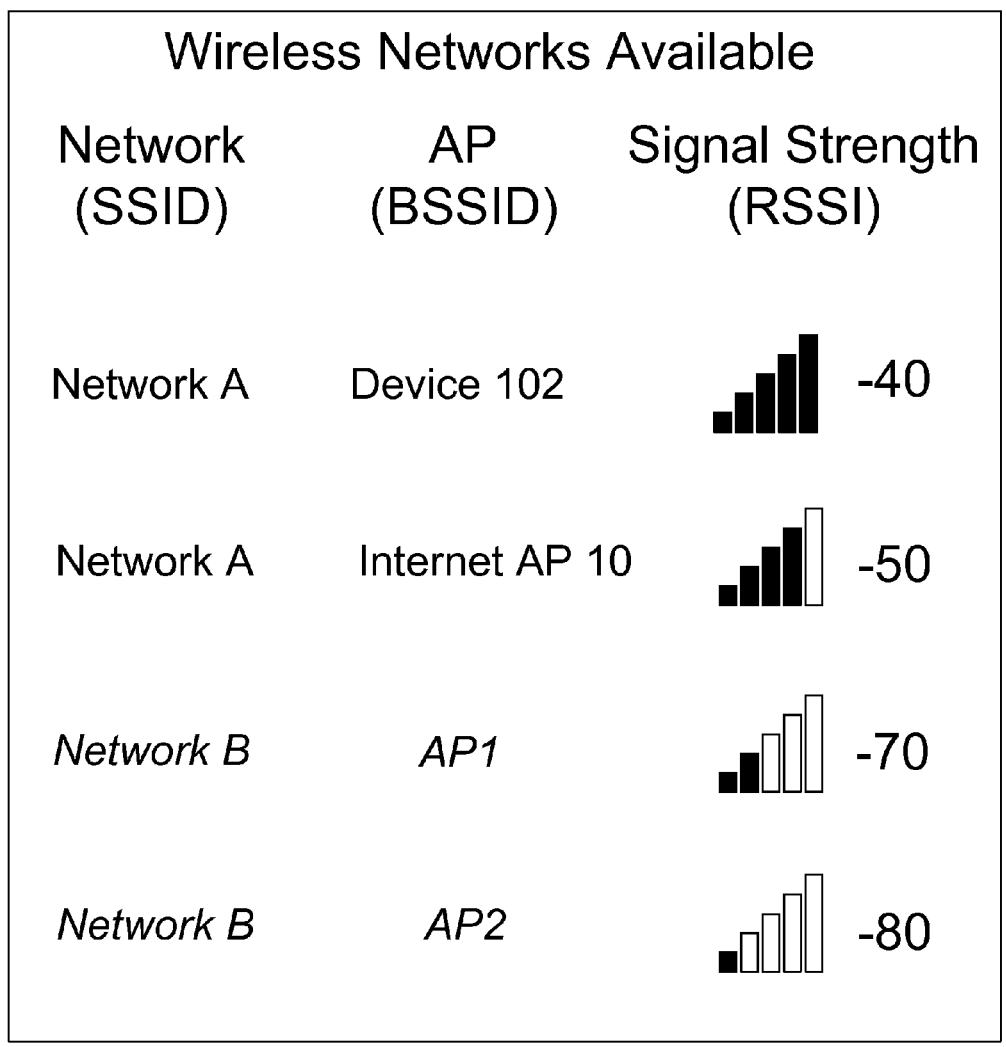
FIG. 5A illustrates an example of access points detected by a client when the wireless repeater is idle again, according to embodiments of the present disclosure.
Figure 5B:
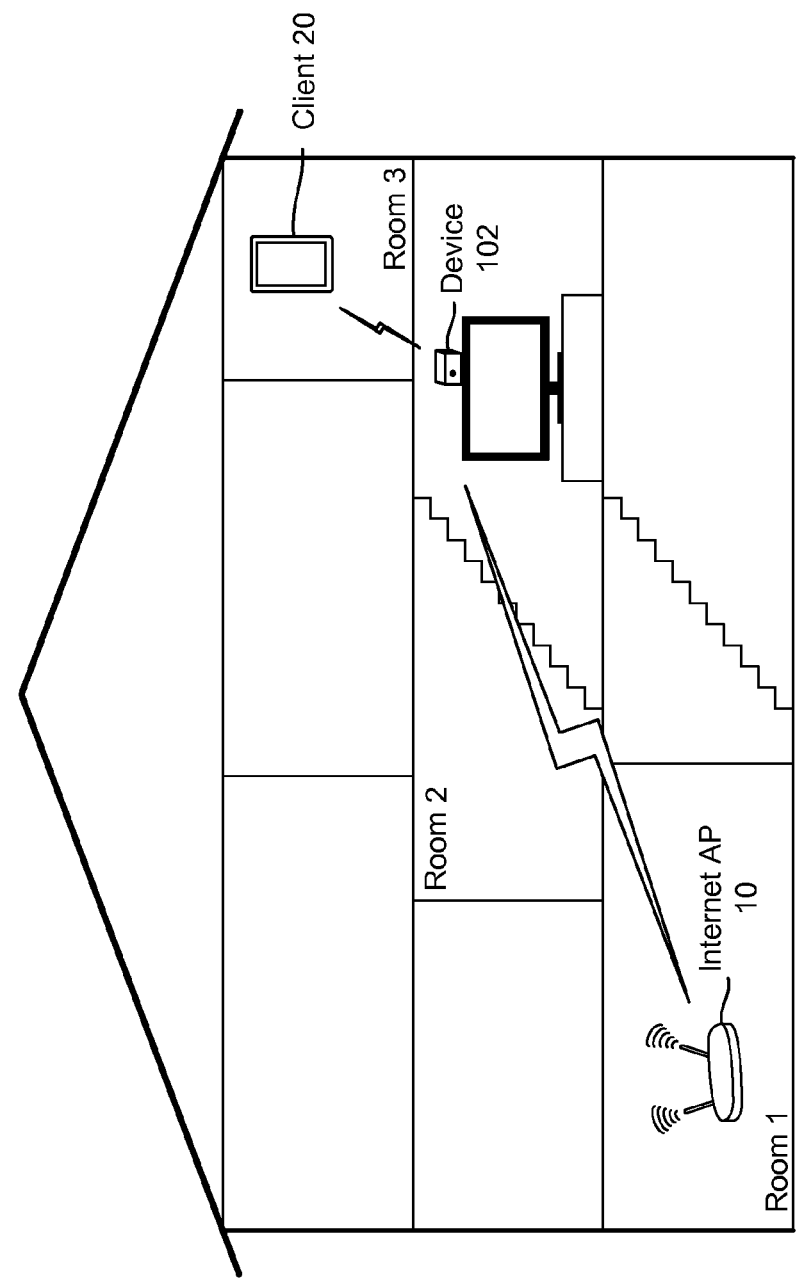
FIG. 5B illustrates an example network configuration when the wireless repeater is idle again, according to embodiments of the present disclosure.

FIG. 5A illustrates an example list of unique access points (e.g., BSSIDs) detected by the client 20 when the device 102 is idle again, including associated signal strengths (e.g., RSSIs) and respective networks (e.g., SSIDs). As illustrated in FIG. 5A, the client 20 may detect the device 102 and the internet AP 10, which are associated with Network A, along with a first access point (AP1) and a second access point (AP2) associated with Network B. As the device 102 is transmitting the capability messages at normal transmission power, the client 20 may detect that a first signal strength associated with the device 102 (e.g., 5 bars or −40 dBm) is greater than a second signal strength associated with the internet AP 10 (e.g., 4 bars or −50 dBm). If the client 20 is configured to connect to Network A, the client 20 may determine that the device 102 has the strongest signal strength associated with Network A and therefore the client 20 may connect to the device 102, as illustrated in FIG. 5B.

As illustrated in FIGS. 4A-4B and 5A-5B, the client 20 may connect to the device 102 or the internet AP 10 based on respective signal strengths detected by the client 20. For example, when the client 20 determines that a first signal strength associated with the device 102 is less than a second signal strength associated with the internet AP 10, the client 20 may disconnect from the device 102 and connect to the internet AP 10. Similarly, when the client 20 determines that a first signal strength associated with the device 102 is greater than a second signal strength associated with the internet AP 10, the client 20 may disconnect from the internet AP 10 and connect to the device 102. Therefore, the device 102 may influence whether the client 20 is connected to the device 102 by reducing the first signal strength associated with the device 102 below signal strengths of other access points (e.g., the second signal strength associated with the internet AP). Thus, by lowering a transmission power for the capability messages when the device 102 is busy while transmitting data traffic at normal transmission power, the device 102 may remove a processing load associated with relayed traffic and improve a performance of the device 102.

Figure 6A:
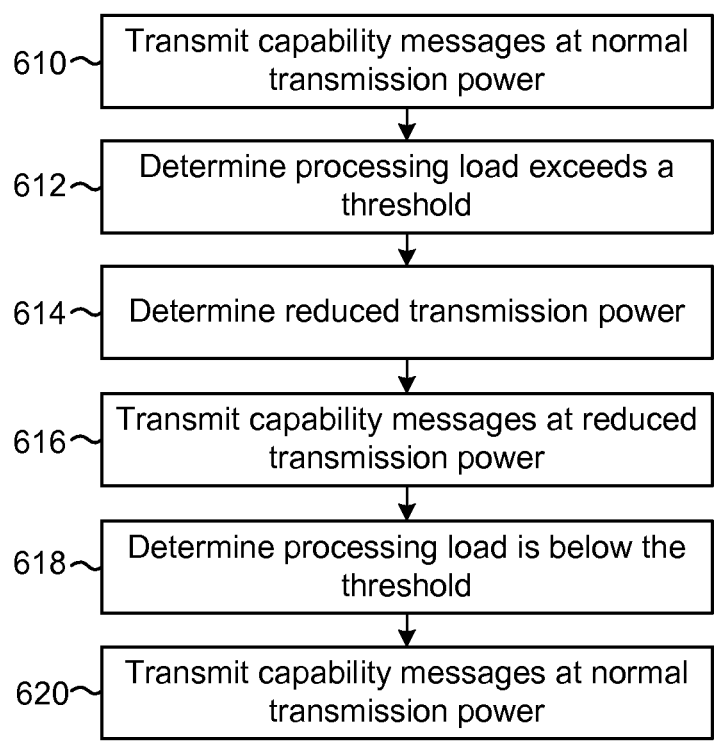
FIGS. 6A-6E are flowcharts conceptually illustrating example methods for adaptively controlling a transmission power for capability messages according to embodiments of the present disclosure.

FIG. 6A is a flowchart conceptually illustrating an example method for reducing a transmission power for capability messages based on a processing load of the device 102. For example, when a processing load associated with local processing of the device 102 increases beyond a threshold, relaying traffic to client(s) (such as client 20) may degrade performance of the local processing as the relayed traffic may limit an amount of processing capability or bandwidth available for the local processing. Thus, when the device 102 is busy (e.g., the processing load increases), the device 102 may reduce the transmission power of capability messages to reduce a perceived signal strength of the device 102, resulting in the client(s) disconnecting from the device 102. When the client(s) are disconnected from the device 102, the local processing may consume available processing capability and bandwidth without being limited by the relayed traffic, improving the performance of the local processing.

The device 102 may transmit (610) capability messages (e.g., beacon frames and probe response frames) at normal transmission power. For example, the device 102 may transmit capability messages at a maximum transmission power or an average operating transmission power for the device 102. The device 102 may determine (612) that a processing load exceeds a threshold. For example, the device 102 may determine that the device 102 is downloading data and/or streaming content above a throughput threshold, that a CPU usage of the device 102 exceeds a threshold, and/or the like.

The device 102 may determine (614) a reduced transmission power, which is lower than the normal transmission power. As will be discussed in greater detail below, the device 102 may determine the reduced transmission power based on a first processing load of the device 102, a second processing load associated with relayed traffic, a difference between a first signal strength of the device 102 and a second signal strength of a competing access point as detected by the client 20, an algorithm, a fixed amount or any combination thereof. In addition, the device 102 may determine the reduced transmission power of capability messages over time. For example, the device 102 may reduce the transmission power in intervals until client(s) disconnect or the second processing load is below a threshold and determine the current transmission power as the reduced transmission power. Further, the device 102 may determine the reduced transmission power based on previous results. For example, the device 102 may reduce the transmission power in a series of intervals at a first time to determine when the client(s) disconnect from the device 102, may store the current transmission power as the reduced transmission power and use the reduced transmission power at a second time after the first time.

The device 102 may transmit (616) capability messages at the reduced transmission power. Thus, the device 102 may use a first transmission power (e.g., normal transmission power) for data traffic (e.g., data frames) and a second transmission power (e.g., reduced transmission power) for the capability messages (e.g., beacon frames and probe response frames). For example, the device 102 may determine a desired transmission power (e.g., Tx descriptor) for each beacon frame or probe response frame and may send the desired transmission power along with the beacon frame or probe response frame from a wireless device driver within the device 102 to transmitter hardware within the device 102 to instruct the transmitter hardware to transmit the beacon frame or probe response frame at the desired transmission power. The exact implementation of including a per-packet attribute with the beacon frame or the probe response frame, such as instructing the transmitter hardware to transmit at the desired transmission power, may vary. An example implementation is described in greater detail above with regard to step 126 illustrated in FIG. 1. Thus, the device 102 may transmit data frames at a normal transmission power, capability messages to first client(s) at a first reduced transmission power and capability messages to second client(s) at a second reduced transmission power. Alternatively, the device 102 may set a transmission power for the capability messages using any methods known to one of skill in the art without departing from the present disclosure.

The device 102 may determine (618) that the processing load is below the threshold and may transmit (620) the capability messages at normal transmission power. For example, the device 102 may determine that the device 102 is downloading data and/or streaming content below the throughput threshold, that a CPU usage of the device 102 is below a threshold and/or the like.

Using steps 612-616, the device 102 may influence client(s) to not connect to the device and/or disconnect from the device 102 and connect to another access point having a higher detected signal strength. By removing a processing load associated with the client(s), the device 102 may prioritize a local processing (e.g., displaying content, downloading and/or streaming video or gaming content or the like) and improve performance of the device 102. Using steps 618-620, the device 102 may determine that the device 102 has the capability to act as a wireless extender and may transmit capability messages at normal transmission power, which may result in client(s) disconnecting from other access points and connecting to the device 102 due to the higher signal strength associated with the device 102.

Figure 6B:
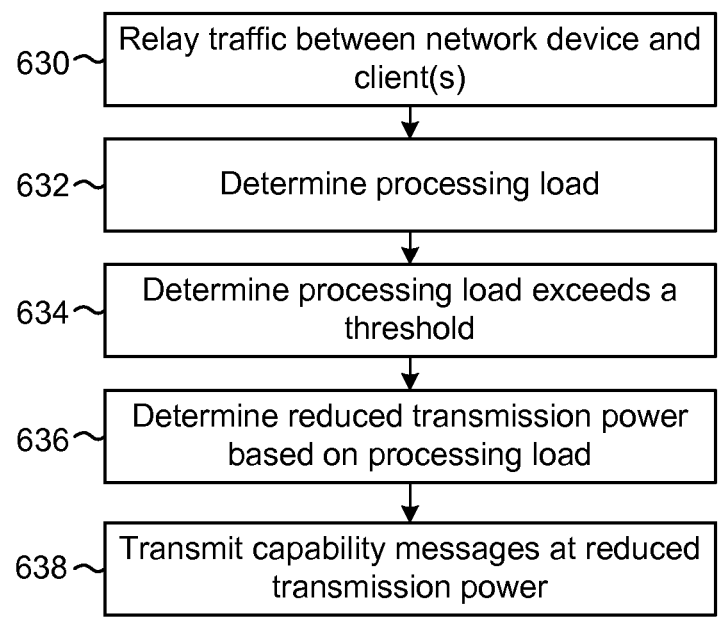

FIG. 6B is a flowchart conceptually illustrating an example method for dynamically controlling a transmission power for capability messages based on a processing load of the device 102. The device 102 may relay (630) traffic between a network device and client(s), such as between the internet AP 10 and the client 20. For example, the device 102 may be configured as a wireless extender and may relay traffic, including signals, data frames, data packets and the like, between the internet AP 10 and the client 20. The device 102 may determine (632) a processing load of the device 102. For example, the device 102 may determine a throughput associated with the device 102 downloading data and/or streaming content, a CPU usage of the device 102, and/or the like. The device 102 may determine (632) that the processing load exceeds a threshold. For example, the device 102 may determine that the device 102 is downloading data and/or streaming content above a throughput threshold, that a CPU usage of the device 102 exceeds a threshold, and/or the like.

The device 102 may determine (636) a reduced transmission power dynamically based on the processing load and may transmit (638) capability messages at the reduced transmission power. For example, the device 102 may determine the reduced transmission power based on a first processing load of the device 102, a second processing load associated with relayed traffic, or a total processing load. Thus, the device 102 may reduce the reduced transmission power in response to an increase in the first processing load, the second processing load and/or the total processing load, resulting in a signal strength associated with the device 102 reducing as the device 102 becomes more busy (e.g., a processing load increases).

Using steps 630-638 illustrated in FIG. 6B, the device 102 may influence client(s) to disconnect from the device 102 and connect to another access point having a higher detected signal strength, as the signal strength associated with the device 102 varies depending on processing load. Thus, when the processing load of the device 102 is the greatest, a corresponding signal strength of the device 102 is the least, prioritizing a local processing (e.g., displaying content, downloading and/or streaming video or gaming content or the like) to improve performance.

While the flowchart illustrated in FIG. 6B reduces the transmission power of capability messages based on the processing load of the device 102, the present disclosure is not limited thereto. Instead, the device 102 may reduce the transmission power of capability messages based on other indications that the device 102 is not idle and that relaying traffic may result in degradation of performance of the device 102.

In some situations, reducing the transmission power of capability messages may not influence client(s) to disassociate with the device 102. Therefore, the device 102 may perform additional steps to influence the client(s) to disconnect from the device, as illustrated in FIGS. 6C and 6E.

Figure 6C:
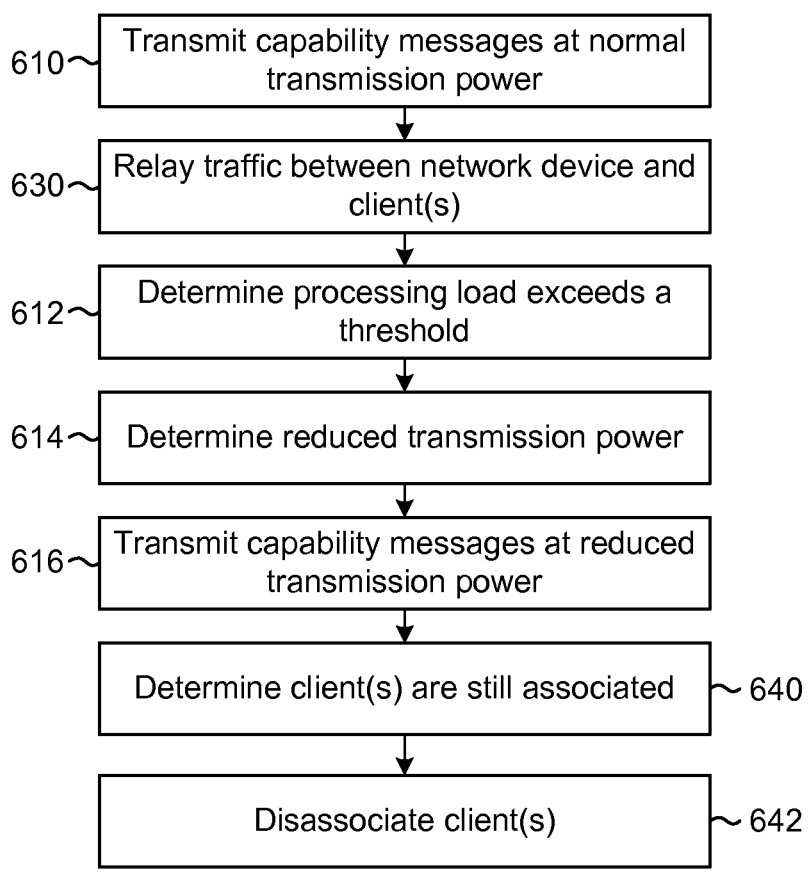

FIG. 6C is a flowchart conceptually illustrating an example method for reducing a transmission power for capability messages and disassociating a client. For ease of explanation, a detailed description of steps described above with regard to FIGS. 6A-6B will be omitted.

As illustrated in FIG. 6C, the device 102 may transmit (610) capability messages at normal transmission power, relay (630) traffic between a network device and client(s), determine (612) that a processing load exceeds a threshold, determine (614) a reduced transmission power, which is lower than the normal transmission power, and transmit (616) capability messages at the reduced transmission power, as described in greater detail above with regard to FIGS. 6A-6B.

In addition, the device 102 may determine (640) that client(s) are still associated with the device 102 and may disassociate (642) client(s). For example, the device 102 may determine that the device 102 is relaying traffic to the client 20 and may directly disassociate the client 20 from the device 102. As an example using IEEE 802.11 specifications, an access point may disassociate with a client by sending a disassociation frame to the client, although the disclosure is not limited thereto and the device 102 may disassociate, disconnect, and/or de-authenticate the client using methods known to one of skill in the art without departing from the disclosure. After being disassociated, the client 20 will perform roaming and determine a strongest access point, the strongest access point having the highest detected signal strength of detected access points, and will attempt to connect to the strongest access point. Based on the reduced transmission power for capability messages, the device 102 may not be the strongest access point and the client 20 may connect to a neighboring access point.

Figure 6D:
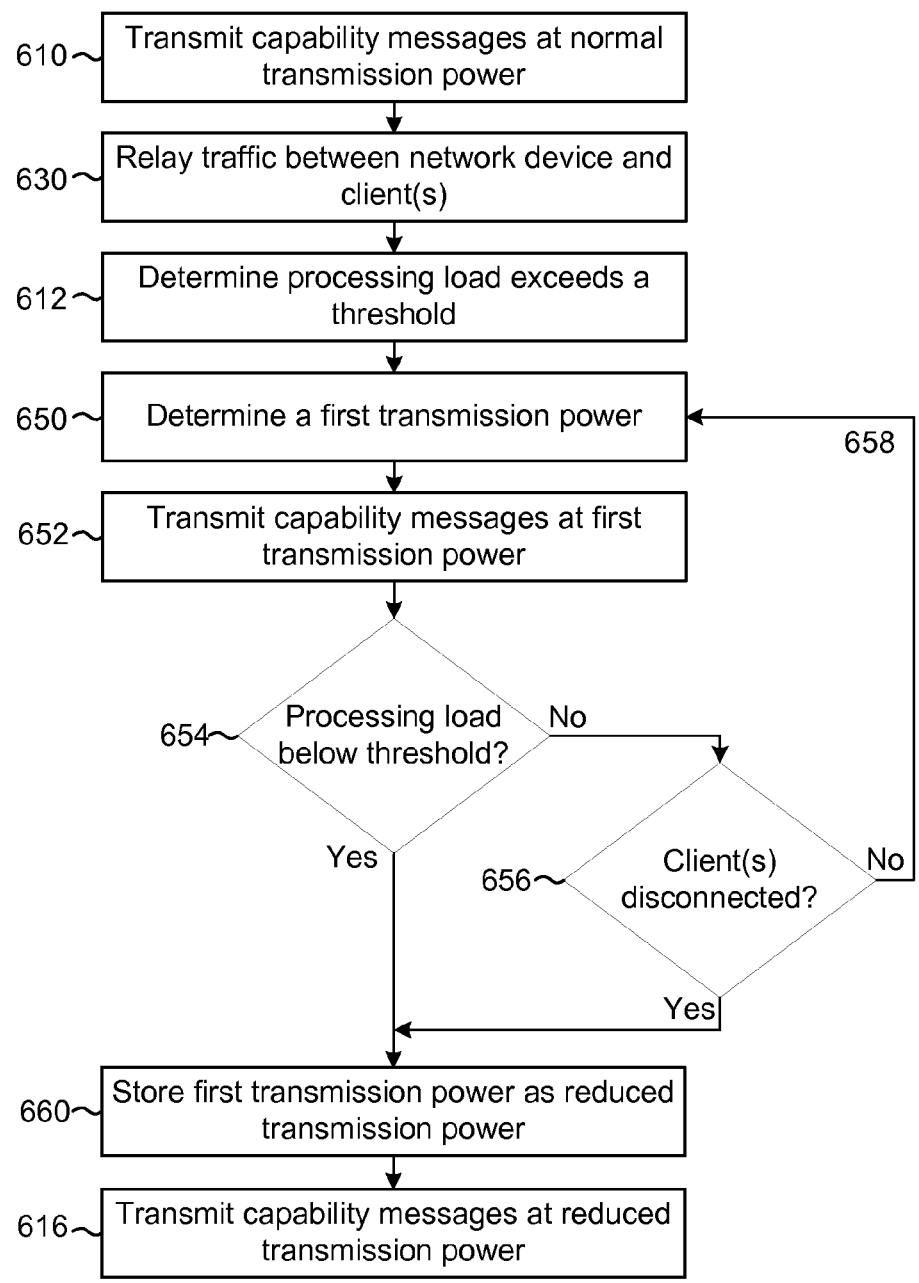
Figure 6E:
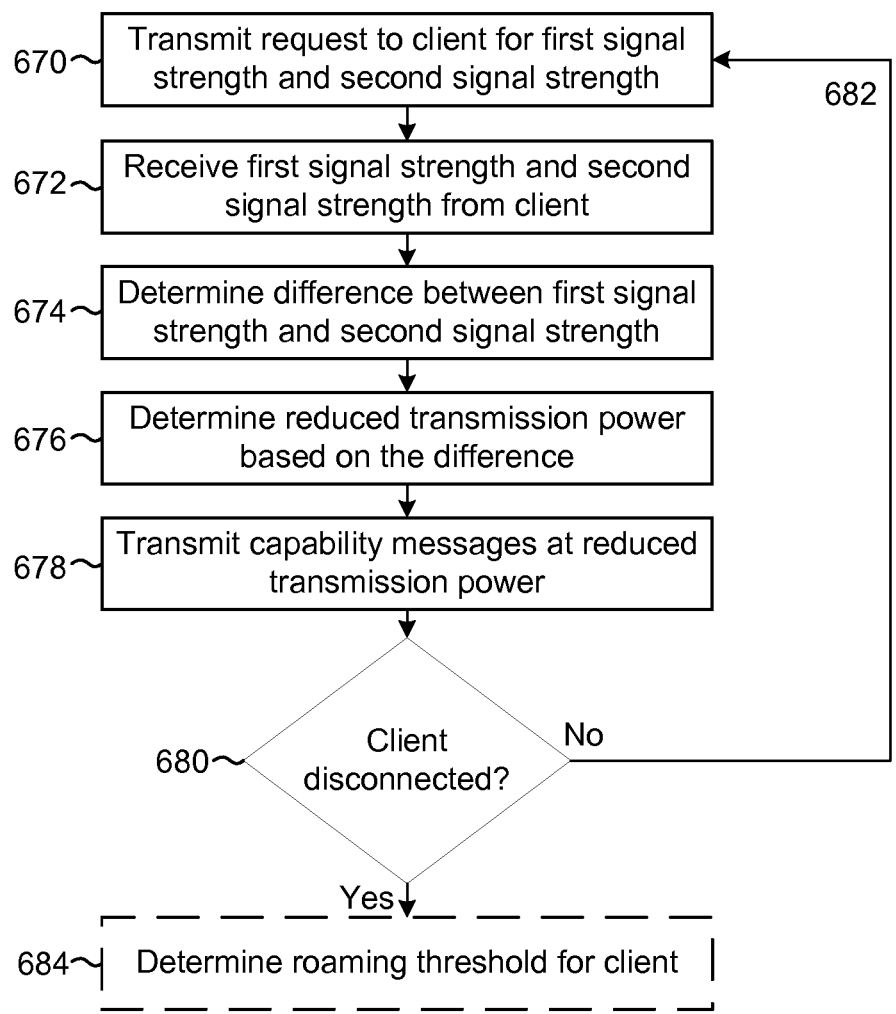

As mentioned above, the device 102 may determine the reduced transmission power of capability messages over time. For example, the device 102 may reduce the transmission power in intervals until client(s) disconnect or the processing load is below a threshold and determine the current transmission power as the reduced transmission power. As illustrated in FIG. 6D, the device 102 may transmit (610) capability messages at normal transmission power, relay (630) traffic between a network device and client(s) and determine (612) that a processing load exceeds a threshold.

The device 102 may determine (650) a first transmission power and may transmit (652) capability messages at the first transmission power. For example, the device 102 may subtract a fixed value from the current transmission power to determine the first transmission power. Based on the capability messages being transmitted at the first transmission power, one or more client(s) may disconnect from the device 102 and connect directly to the internet AP 10 if the client(s) determine that a first signal strength of the device 102 falls below a second signal strength of the internet AP 10. However, depending on individual client implementations, the client(s) may remain connected to the device 102 even when the first signal strength falls below the second signal strength. For example, a difference between the first signal strength and the second signal strength may not exceed a threshold required by the client(s) to perform roaming. Therefore, the device 102 may optionally disassociate client(s) (as discussed above in step 642) between step 650 and step 652 to force the client(s) to disconnect and perform roaming to determine a strongest access point.

To determine if the first transmission power is sufficient, the device 102 may determine (654) if the processing load is below the threshold. If the processing load is below the threshold, the device 102 may determine that the first transmission power is sufficient and may proceed to step 660. If the processing load is not below the threshold, the device 102 may determine (656) if client(s) disconnected. If a sufficient number of client(s) disconnected, the device 102 may proceed to step 660. If the device 102 determines that not enough client(s) disconnected (compared to a number of clients connected during step 630), the device 102 may loop (658) to step 650 and determine an updated first transmission power, for example by subtracting the fixed value from the previous transmission power.

If the processing load is below the threshold and/or a sufficient number of client(s) disconnected, the device 102 may store (660) the first transmission power as the reduced transmission power and may transmit (616) capability messages at the reduced transmission power.

In some situations, reducing the transmission power of capability messages may not influence client(s) to disassociate with the device 102. For example, the reduced transmission power may result in a first signal strength associated with the device 102 that is still greater than a second signal strength associated with a competing access point, such as the internet AP 10. Therefore, to influence the client(s) to disconnect from the device 102 and connect to a competing access point, the device 102 may need to determine the second signal strength associated with the competing access point and determine the reduced transmission power so that the first signal strength is less than the second signal strength, as illustrated in FIG. 6E.

FIG. 6E is a flowchart conceptually illustrating an example method for determining a difference between a first signal strength of the device 102 and a second signal strength of a neighboring access point and reducing the transmission power for capability messages by the difference. The device 102 may transmit (670) a request to a client for signal strength data, including a first signal strength and a second signal strength. For example, the first signal strength may be associated with the device 102 and the second signal strength may be associated with a competing access point, such as the internet AP 10, as detected by the client 20. In one example, the signal strength data may include the signal strength of the device 102 and the signal strength of the next strongest access point, providing enough information for the device 102 to reduce the signal strength below a competing access point. However, the disclosure is not limited thereto and the signal strength data may include signal strengths associated with multiple access points within range of the client 20 without departing from the present disclosure. The device 102 may receive (672) the signal strength data from the client, including the first signal strength and the second signal strength. The device 102 may determine (674) a difference between the first signal strength and the second signal strength, may determine (676) a reduced transmission power based on the difference and may transmit (678) capability messages at the reduced transmission power.

Based on the capability messages being transmitted at the first transmission power, one or more client(s) may disconnect from the device 102 and connect directly to the internet AP 10 if the client(s) determine that a first signal strength of the device 102 falls below a second signal strength of the internet AP 10. However, depending on individual client implementations, the client(s) may remain connected to the device 102 even when the first signal strength falls below the second signal strength. For example, a difference between the first signal strength and the second signal strength may not exceed a roaming threshold required by the client(s) to perform roaming. Therefore, the device 102 may optionally disassociate client(s) (as discussed above in step 642) between step 676 and step 678 to force the client(s) to disconnect and perform roaming to determine a strongest access point.

As discussed above, the client may remain connected to the device 102 until the first signal strength is below the second signal strength by at least the roaming threshold. Therefore, as part of determining the reduced transmission power in step 676, the device 102 may subtract from the normal transmission power the difference and the roaming threshold. When the roaming threshold is not known, the device 102 may subtract a typical roaming threshold or a fixed value.

The device 102 may determine (680) if the client disconnected. For example, the device 102 may determine if the device 102 is relaying traffic between the internet AP 10 and the client 20 or, if the device 102 disassociated the client prior to step 678, the device 102 may determine whether the client remains disconnected or the client attempted to reconnect to the device 102. If the client did not disconnect (or remain disconnected), this may indicate that a signal strength associated with the reduced transmission power still exceeds the second signal strength. Therefore, the device 102 may loop (682) to step 670 and repeat steps 670-680. If the client disconnected (and remained disconnected), the device 102 may optionally determine (684) a roaming threshold for the client. For example, the client may remain connected to the device 102 until the first signal strength associated with the device 102 is below the second signal strength by more than the roaming threshold. By determining the roaming threshold, the device may increase a likelihood that the client disconnects by determining the reduced transmission power using the roaming threshold and the difference.

For example, the device 102 may transmit capability messages at a normal transmission power (e.g., 15 dBm), while the client 20 may receive the capability messages and determine that a first signal strength (e.g., RSSI, mapped to dBm) associated with the device 102 is roughly −50 dBm. The client 20 may also receive capability messages from the internet AP 10 and may determine that a second signal strength associated with the internet AP 10 is roughly −60 dBm. Thus, if the RSSI associated with capability messages transmitted using the reduced transmission power is greater than −60 dBm, the client 20 will remain connected to the device 102. Therefore, the device 102 may transmit a request to the client 20 for the signal strength data, including the first signal strength and the second signal strength, and the device 102 may receive the signal strength data from the client 20. Based on the signal strength data, the device 102 may determine a difference between the signal strength associated with the device 102 (e.g., the first signal strength, or −50 dBm) and the signal strength associated with the next strongest access point (e.g., the second signal strength, or −60 dBm) to be −10 dBm. Therefore, the device 102 may determine the reduced transmission power based on the difference and a normal transmission power of the device 102. For example, the device 102 may determine that that the normal transmission power of the device 102 is 15 dBm, that the difference is −10 dBm and therefore the reduced transmission power of the device must be lower than 5 dBm.

In the example illustrated above, for ease of explanation the RSSI value is mapped to a dBm value. For example, the RSSI value may be an integer with an allowable range of 0-255, depending on which wireless vendor manufactures the client 20. The RSSI value used internally by the client 20 may be mapped to dBm using a table. As the integer value may vary depending on vendor, the present disclosure refers to a dBm measurement instead of using the actual RSSI value. However, the present disclosure is not limited thereto and the device 102 may perform more complicated processing to determine the reduced transmission power. For example, the signal strength may be measured using units of mW (milliwats), dBm ("dB"-milliwats), RSSI and/or a percentage measurement. In addition, a signal to noise ratio (SNR) may be a unitless ratio measured in dB. To determine the reduced transmission power, the device 102 may convert between one unit to another.

The RSSI detected by the client 20 depends on a number of environmental factors. Therefore, the device 102 may not be able to accurately determine the RSSI corresponding to the reduced transmission power. To increase a likelihood that the client 20 disconnects from the device 102, the device 102 may determine the reduced transmission power by decreasing the normal transmission power by the difference, the roaming threshold and an additional amount.

While FIG. 6E illustrates the device 102 requesting a single client for the first signal strength and the second signal strength to determine the reduced transmission power, the present disclosure is not limited thereto. Instead, the device 102 may perform steps 670-674 for multiple clients and use the largest difference to determine the reduced transmission power. For example, the device 102 may determine that a first difference detected by a first client is −10 dBm and a second difference detected by a second client is −15 dBm. If the device 102 determines the reduced transmission power using the first difference (e.g., −10 dBm), the first client may disconnect but the second client may remain connected to the device 102. However, if the device 102 determines the reduced transmission power using the second difference (e.g., −15 dBm), the first client and the second client may both disconnect. Therefore, the device 102 may use the largest difference to increase a likelihood that multiple clients disconnect from the device 102.

Currently, IEEE 802.11 specifications do not enable the device 102 to request the client to send the signal strength data or for the client to send the signal strength data to the device 102. However, the device 102 may request the signal strength data using a higher layer in the seven-layer Open Systems Interconnection model (OSI Model) of computer networking. As IEEE 802.11 specifications include physical layer (PHY) specifications from Layer 1 (Physical layer) and media access control (MAC) protocol from Layer 2 (Data link layer), the device 102 may use specifications from higher layers, such as Internet Protocol (IP) from Layer 3 (Network layer), Transmission Control Protocol (TCP) from Layer 4 (Transport layer), Hypertext Transfer Protocol (HTTP) from Layer 7 (Application layer) or the like. For example, the device 102 may send action frames using the IP, TCP or HTTP protocols to the client and the client may send the signal strength data using the chosen protocol. However, as the action frames are not included in the IEEE 802.11 specifications, this functionality needs to be supported by both the device 102 and the client. Therefore, the device 102 may only request signal strength data and receive the signal strength data from clients that are configured to send the signal strength data.

Figure 7A:
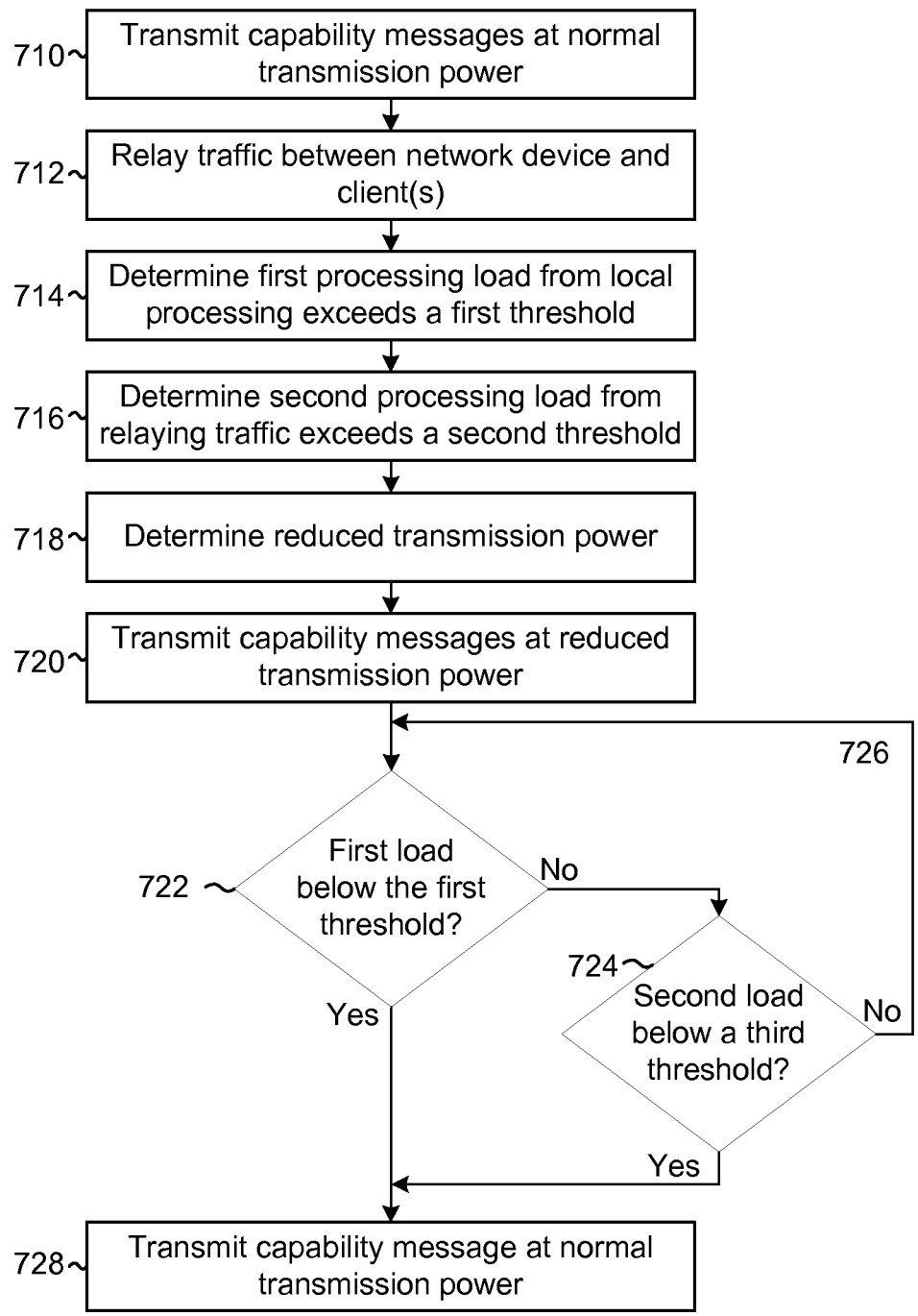
FIGS. 7A-7B are flowcharts conceptually illustrating example methods for adaptively controlling a transmission power for capability messages based on a processing load associated with relayed traffic, according to embodiments of the present disclosure.
Figure 7B:
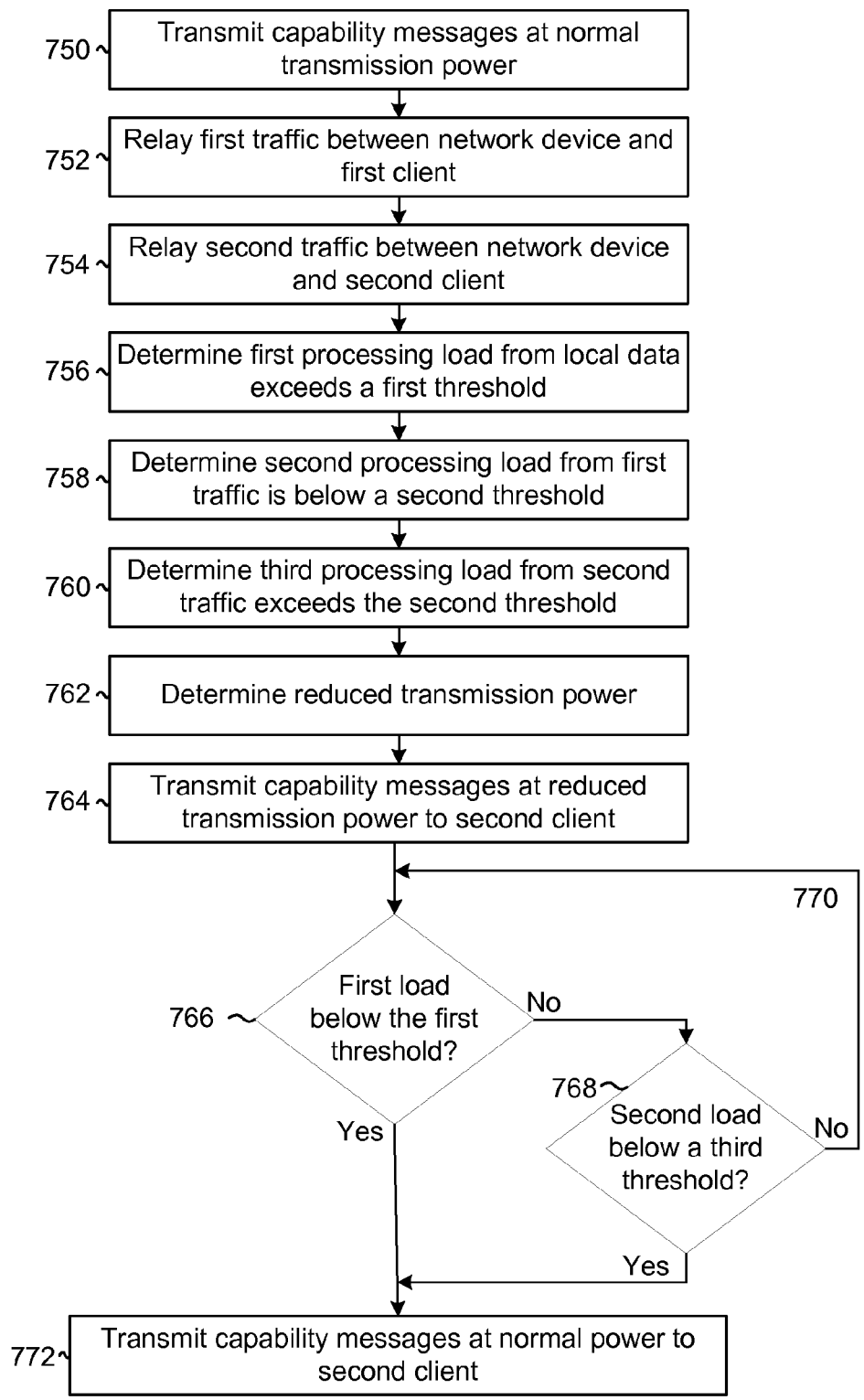

FIGS. 7A-7B are flowcharts conceptually illustrating example methods for adaptively controlling a transmission power for capability messages based on a processing load associated with relayed traffic, according to embodiments of the present disclosure. For example, the example method illustrated by the flowchart of FIG. 7A reduces the transmission power for capability messages if the device 102 is busy (e.g., first processing load from local data exceeds a first threshold) and the relayed traffic may be interfering with the device 102 (e.g., second processing load associated with relayed traffic exceeds a second threshold), and resumes normal transmission power if either the device 102 is no longer busy (e.g., first processing load is below the first threshold) or the relayed traffic does not interfere with the device 102 (e.g., second processing load is below the second threshold).

The device 102 may transmit (710) capability messages at normal transmission power. For example, the device 102 may transmit capability messages (e.g., beacon frames and probe response frames) at a maximum transmission power or an average operating transmission power for the device 102. The device 102 may relay (712) traffic between a network device and client(s), such as between the internet AP 10 and the client 20. For example, the device 102 may be configured as a wireless extender and may relay traffic, including signals, data frames, data packets and the like, between the internet AP 10 and the client 20.

The device 102 may determine (714) that a first processing load from local processing exceeds a first threshold. The local processing of the device 102 (e.g., displaying content, downloading and/or streaming video or gaming content or the like) may result in the first processing load having first processing usage (e.g., CPU usage), such as a workload, and/or a first throughput (e.g., amount of data used), such as video streaming traffic. For example, the device 102 may determine that the device 102 is downloading data and/or streaming content above a first throughput threshold, that a CPU usage of the device 102 exceeds a first threshold, and/or the like.

The device 102 may determine (716) that a second processing load from relaying traffic exceeds a second threshold. The relaying traffic (e.g., relaying data packets between the internet AP 10 and the client 20) may result in a second processing load having second processing usage (e.g., CPU usage), such as a workload, and/or a second throughput (e.g., amount of data used), such as video streaming traffic. For example, the device 102 may determine that the device 102 is relaying data and/or streaming content above a second throughput threshold, that a CPU usage of the device 102 exceeds a second threshold, and/or the like.

The device 102 may determine (718) a reduced transmission power, which is lower than the normal transmission power. The device 102 may determine the reduced transmission power based on the first processing load of the device 102, the second processing load associated with relayed traffic, a difference between a first signal strength of the device 102 and a second signal strength of a competing access point as detected by the client 20, an algorithm, a fixed amount or any combination thereof. In addition, the device 102 may determine the reduced transmission power over time. For example, the device 102 may reduce the transmission power in intervals until client(s) disconnect or the second processing load is below a threshold and determine the current transmission power as the reduced transmission power. Further, the device 102 may determine the reduced transmission power based on previous results. For example, the device 102 may reduce the transmission power in a series of intervals at a first time to determine when the client(s) disconnect from the device 102, may store the current transmission power as the reduced transmission power and use the reduced transmission power at a second time after the first time.

The device 102 may transmit (720) capability messages at the reduced transmission power. Thus, the device 102 may use a first transmission power (e.g., normal transmission power) for data traffic (e.g., data frames) and a second transmission power (e.g., reduced transmission power) for the capability messages (e.g., beacon frames and probe response frames). For example, the device 102 may determine a desired transmission power (e.g., Tx descriptor) for each beacon frame or probe response frame and may send the desired transmission power along with the beacon frame or probe response frame from a wireless device driver within the device 102 to transmitter hardware within the device 102 to instruct the transmitter hardware to transmit the beacon frame or probe response frame at the desired transmission power. The exact implementation of including a per-packet attribute with the beacon frame or the probe response frame, such as instructing the transmitter hardware to transmit at the desired transmission power, may vary. An example implementation is described in greater detail above with regard to step 126 illustrated in FIG. 1. Thus, the device 102 may transmit data frames at a normal transmission power, capability messages to first client(s) at a first reduced transmission power and capability messages to second client(s) at a second reduced transmission power. Alternatively, the device 102 may set a transmission power for the capability messages using any methods known to one of skill in the art without departing from the present disclosure.

Based on the capability messages being transmitted at the first transmission power, one or more client(s) may disconnect from the device 102 and connect directly to the internet AP 10 if the client(s) determine that a first signal strength of the device 102 falls below a second signal strength of the internet AP 10. However, depending on individual client implementations, the client(s) may remain connected to the device 102 even when the first signal strength falls below the second signal strength. For example, a difference between the first signal strength and the second signal strength may not exceed a roaming threshold required by the client(s) to perform roaming. Therefore, the device 102 may optionally disassociate client(s) (as discussed above in step 642) between step 718 and step 720 to force the client(s) to disconnect and perform roaming to determine a strongest access point.

Alternatively, the device 102 may allow existing client(s) to remain connected to the device 102 and may deny connections to additional client(s) attempting to connect to the device 102. For example, the device 102 may determine that the second processing load from relaying traffic is associated with a first client. The device 102 may transmit the capability messages at the reduced transmission power without disconnecting the first client. Thus, the first client may remain connected to the device 102 even when the capability messages are transmitted at the reduced transmission power, if the first signal strength associated with the device 102 is not lower than a second signal strength by a roaming threshold. In addition, a second client may attempt to connect to the device 102 even when the capability messages are transmitted at the reduced transmission power. However, the device 102 may deny the connection to the second client, or any additional client, while the device 102 transmits the capability messages at the reduced transmission power.

The device 102 may determine (722) if the first processing load is below the first threshold. If the first processing load exceeds the first threshold, the device 102 may proceed to step 724, while if the first processing load is below the first threshold, the device 102 may proceed to step 728. The device 102 may determine (724) if the second processing load is below a third threshold, the third threshold being lower than the second threshold. For example, transmitting capability messages at the reduced transmission power is intended to influence client(s) to disconnect from the device 102, reducing the second processing load. In order to determine that the device 102 has the capability to relay traffic to client(s) again without a reduction in the first processing load, the device 102 must determine that the second processing load is below the third threshold. In some examples, the third threshold may be set to a value of zero, such that the device 102 only proceeds to step 728 if the first processing load is below the first threshold. If the second processing load is not below the third threshold, the device 102 may loop (726) to step 722 and repeat steps 722-726 until the first processing load is below the first threshold or the second processing load is below the third threshold. If the second processing load is below the third threshold, the device 102 may proceed to step 728, where the device 102 may transmit (728) the capability messages at normal transmission power.

Using steps 714-720, the device 102 may influence client(s) to not connect to the device and/or disconnect from the device 102 and connect to another access point having a higher detected signal strength. By removing the second processing load associated with the client(s), the device 102 may prioritize a local processing (e.g., displaying content, downloading and/or streaming video or gaming content or the like) and improve a performance of the device 102. Using steps 722-728, the device 102 may determine that the device 102 has the capability to act as a wireless extender and may transmit capability messages at normal transmission power, which may result in client(s) disconnecting from other access points and connecting to the device 102 due to the higher signal strength associated with the device 102.

While the example method illustrated by the flowchart of FIG. 7A reduces transmission power for capability messages evenly for connected clients, the example method illustrated by the flowchart of FIG. 7B selectively reduces transmission power for capability messages to particular clients based on a processing load associated with individual clients.

The device 102 may transmit (750) capability messages at normal transmission power, as discussed in greater detail above with regard to step 710.

The device 102 may relay (752) first traffic between a network device and a first client and may relay (754) second traffic between the network device and a second client. For example, the device 102 may be configured as a wireless extender and may relay traffic, including signals, data frames, data packets and the like, between the internet AP 10 and both the first client and the second client.

The device 102 may determine (756) that a first processing load from local processing exceeds a first threshold, as discussed in greater detail above with regard to step 714. The device 102 may determine (758) that a second processing load from relaying the first traffic is below a second threshold and may determine (760) that a third processing load from relaying the second traffic exceeds the second threshold. The first traffic (e.g., relaying data packets between the internet AP 10 and the first client) may result in a second processing load having second processing usage (e.g., CPU usage), such as a workload, and/or a second throughput (e.g., amount of data used), such as video streaming traffic. The second traffic (e.g., relaying data packets between the internet AP 10 and the second client) may result in a third processing load having third processing usage (e.g., CPU usage), such as a workload, and/or a third throughput (e.g., amount of data used), such as video streaming traffic.

The device 102 may determine (762) a reduced transmission power, as discussed in greater detail above with regard to step 718. The device 102 may transmit (764) capability messages at the reduced transmission power, as discussed in greater detail above with regard to step 720, only to the second client. For example, the device 102 may continue to transmit the capability messages at the normal transmission power to the first client while transmitting the capability messages at the reduced transmission power to the second client. In addition to the second client, the device 102 may transmit the capability messages at the reduced transmission power to additional client(s) that attempt to connect to the device 102.

Based on the capability messages being transmitted at the first transmission power, the second client may disconnect from the device 102 and connect directly to the internet AP 10 if the second client determines that a first signal strength of the device 102 falls below a second signal strength of the internet AP 10. However, depending on individual client implementations, the second client may remain connected to the device 102 even when the first signal strength falls below the second signal strength. For example, a difference between the first signal strength and the second signal strength may not exceed a roaming threshold required by the second client to perform roaming. Therefore, the device 102 may optionally disassociate the second client (as discussed above in step 642) between step 762 and step 764 to force the second client to disconnect and perform roaming to determine a strongest access point.

Alternatively, the device 102 may allow the first client and the second client to remain connected to the device 102 and may deny connections to additional client(s) attempting to connect to the device 102. For example, the device 102 may transmit the capability messages at the reduced transmission power without disconnecting the second client. Thus, the second client may remain connected to the device 102 even when the capability messages are transmitted at the reduced transmission power, if the first signal strength associated with the device 102 is not lower than a second signal strength by a roaming threshold. In addition, a third client may attempt to connect to the device 102 even when the capability messages are transmitted at the reduced transmission power. However, the device 102 may deny the connection to the third client, or any additional client, while the device 102 transmits the capability messages at the reduced transmission power.

Using IEEE 802.11 specifications, the device 102 may transmit the capability messages at the reduced transmission power to the second client using one of two implementations. As a first example, the device 102 may transmit both the beacon frames and the probe response frames to the second client (and any additional client, excluding the first client) at the reduced transmission power. However, while probe response frames are transmitted to an individual client (unicast), beacon frames are transmitted to multiple clients (multicast). Thus, the device 102 transmits the beacon frames to all clients at the reduced transmission power, including the first client. Therefore, the first client may receive the beacon frames at the reduced transmission power and may disconnect from the device 102.

If the first client attempts to reconnect by sending a probe request frame, the device 102 may transmit the probe response frame to the first client at the normal transmission power and the first client may reconnect to the device 102. If the second client disconnects (or the device 102 optionally disassociates the second client as discussed above in step 642) and attempts to reconnect by sending a probe request frame, the device 102 may transmit the probe response frame to the second client at the reduced transmission power and the second client may choose not to reconnect to the device 102. Alternatively, the device 102 may explicitly deny the connection to the second client. In addition, the device 102 may transmit probe response frames at the reduced transmission power and/or deny connections to any additional clients attempting to connect to the device 102.

As a second example, the device 102 may transmit beacon frames to all clients at the normal transmission power and may transmit the probe response frames to the second client (and optionally any additional client, excluding the first client) at the reduced transmission power. As the beacon frames are transmitted at the normal transmission power, the second client will not disconnect from the device 102 as a signal strength associated with the beacon frames will not trigger a roaming event for the second client. Further, the device 102 will not send a probe response frame to the second client at the reduced transmission power because the device 102 only sends a probe response frame in response to a probe request frame, which the second client transmits when attempting to connect to the device 102. Therefore, to disconnect the second client from the device 102, the device 102 may disassociate the second client as discussed above in step 642. However, as the device 102 transmits the beacon frames to all clients at the normal transmission power, including the second client, the second client may attempt to reconnect to the device 102 by transmitting a probe request frame. In response, the device 102 may transmit a probe response frame to the second client at the reduced transmission power and the second client may choose to not reconnect to the device 102. Alternatively, the device 102 may explicitly deny the connection to the second client. In addition, the device 102 may transmit probe response frames at the reduced transmission power and/or deny connections to any additional clients attempting to connect to the device 102.

The device 102 may determine (766) if the first processing load is below the first threshold. If the first processing load exceeds the first threshold, the device 102 may proceed to step 768, while if the first processing load is below the first threshold, the device 102 may proceed to step 772. The device 102 may determine (768) if the second processing load is below a third threshold, the third threshold being lower than the second threshold. For example, transmitting capability messages at the reduced transmission power to the second client is intended to influence the second client to disconnect from the device 102, removing the third processing load. In order to determine that the device 102 has the capability to relay traffic to the second client again without a reduction in the first processing load, the device 102 must determine that the second processing load is below the third threshold. In some examples, the third threshold may be set to a value of zero, such that the device 102 only proceeds to step 772 if the first processing load is below the first threshold. If the second processing load is not below the third threshold, the device 102 may loop (770) to step 766 and repeat steps 766-770 until the first processing load is below the first threshold or the second processing load is below the third threshold. If the second processing load is below the third threshold, the device 102 may proceed to step 772, where the device 102 may transmit (772) the capability messages at normal transmission power to the second client.

Using steps 756-764, the device 102 may influence the second client to disconnect from the device 102 and connect to another access point having a higher detected signal strength. By removing the third processing load associated with the second client, the device 102 may prioritize a local processing (e.g., displaying content, downloading and/or streaming video or gaming content or the like) and improve a performance of the device 102, while still relaying the first traffic to the first client. Using steps 766-772, the device 102 may determine that the device 102 has the capability to relay traffic to the second client, which may result in the second client disconnecting from other access points and connecting to the device 102 due to the higher signal strength associated with the device 102.

Figure 8:
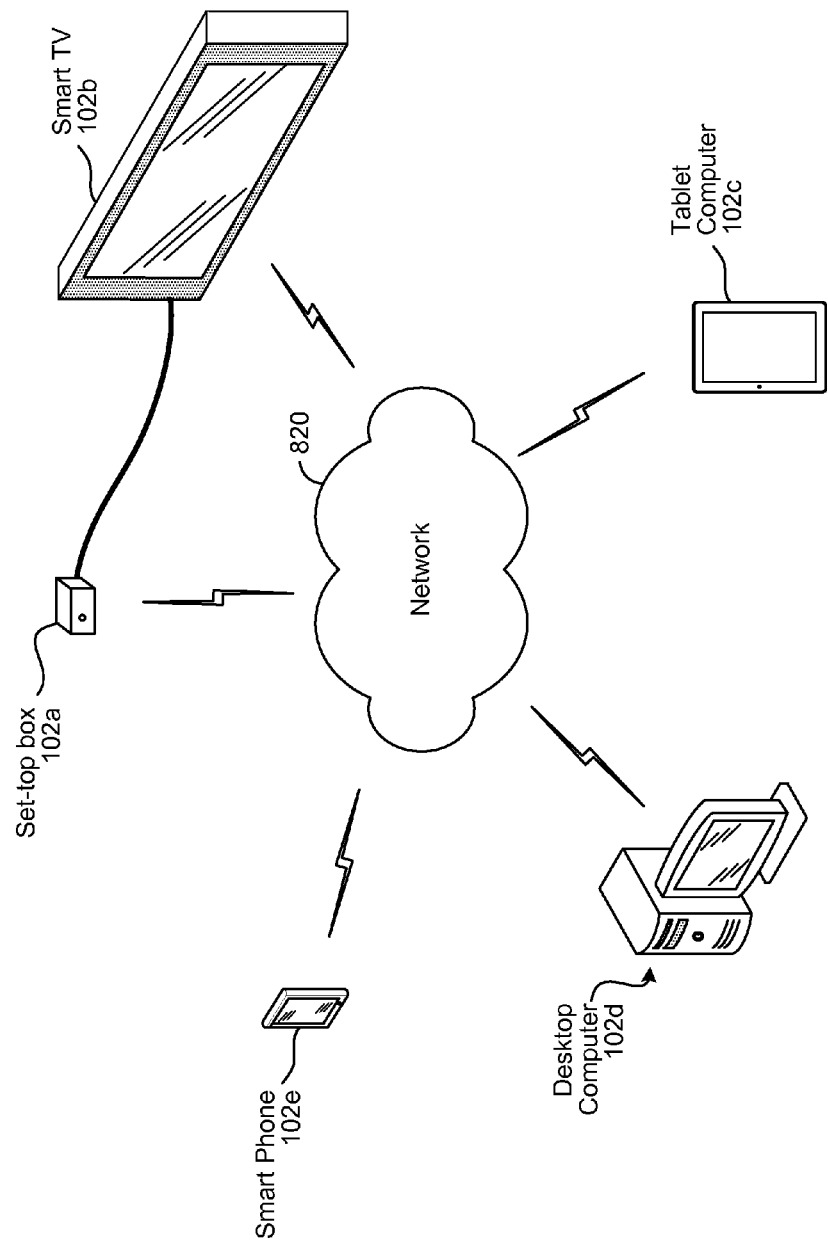
FIG. 8 is a block diagram conceptually illustrating an example of a computer network for use with the present system.

As shown in FIG. 8, multiple devices may be connected over a network 820. The network 820 may include a local or private network or may include a wide network such as the internet. Devices may be connected to the network 820 through either wired or wireless connections. For example, a smart phone 102e may be connected to the network 820 through a wireless service provider and/or through a wireless connection, for example by using a wireless adapter to communicate with a network device. Some devices, such as set-top box 102a, smart TV 102b, tablet computer 102c and/or desktop computer 102d, may be connected to the network 820 through a wireless connection (e.g., using a wireless adapter to communicate with a network device, such as an access point or a device 102 acting as a wireless repeater), and/or may be connected to the network 820 through a wired connection.

Figure 9:
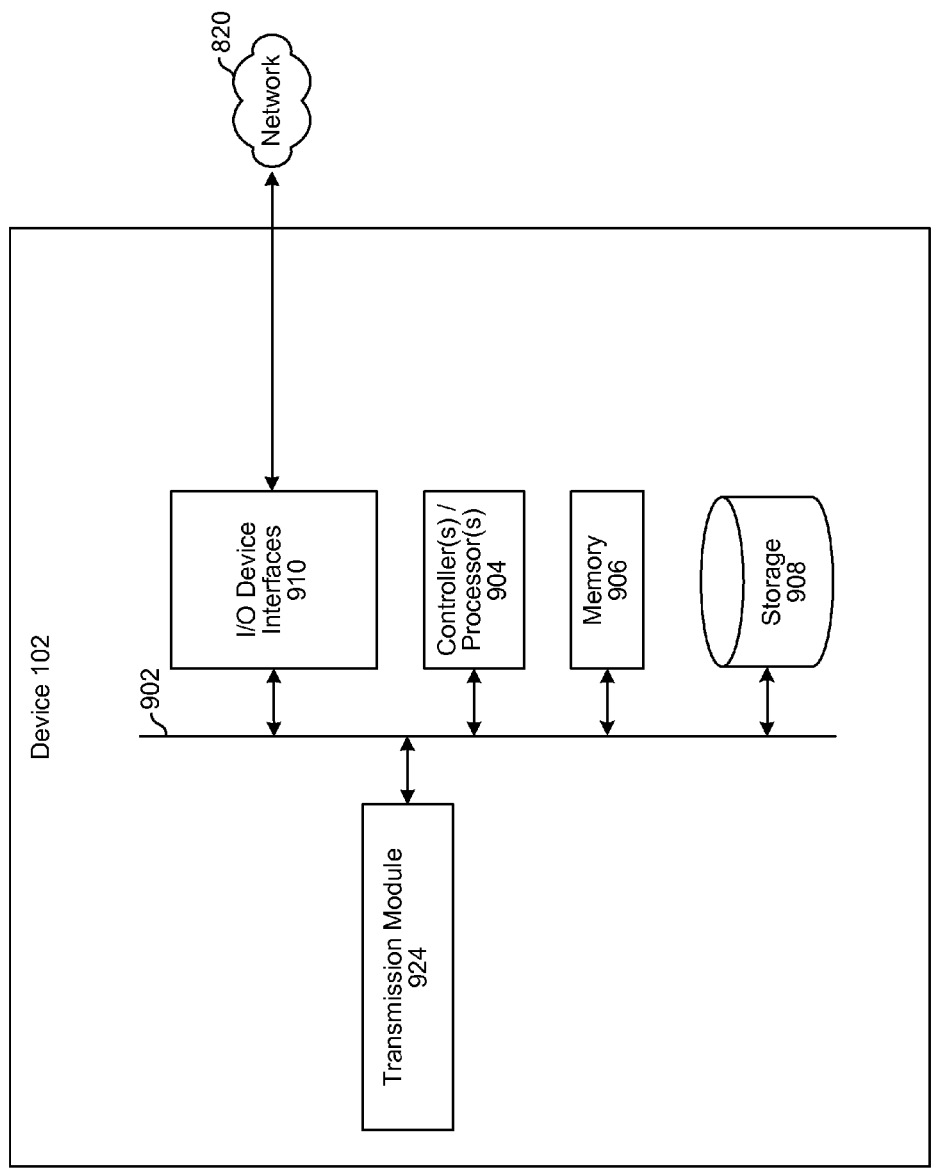
FIG. 9 is a block diagram conceptually illustrating example components of a system according to embodiments of the present disclosure.

FIG. 9 illustrates a block diagram conceptually illustrating example components of a system including a computing device 102. Other components not illustrated may also be included in the device 102. In operation, the system may include computer-readable and computer-executable instructions that reside in storage 908 on the device 102. The device 102 may be an electronic device capable of acting as a wireless extender. Examples of electronic devices may include computers (e.g., a desktop, a laptop, a server or the like), portable devices (e.g., an electronic reader, smart phone, tablet or the like), media devices (e.g., televisions, video game consoles, headless devices or the like) or the like. The device 102 may also be a component of any of the abovementioned devices or systems.

As illustrated in FIG. 9, the device 102 may include an address/data bus 902 for conveying data among components of the computing device 102. Each component within the computing device 102 may also be directly connected to other components in addition to (or instead of) being connected to other components across the bus 902.

The computing device 102 may include one or more controllers/processors 904 comprising one-or-more central processing units (CPUs) for processing data and computer-readable instructions and a memory 906 for storing data and instructions. The memory 906 may include volatile random access memory (RAM), non-volatile read only memory (ROM), non-volatile magnetoresistive (MRAM) and/or other types of memory. The device 102 may also include a data storage component 908 for storing data and processor-executable instructions. The data storage component 908 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 910. The input/output device interfaces 910 may be configured to operate with a network 820, for example a wireless local area network (WLAN) (such as WiFi), Bluetooth, zigbee and/or wireless networks, such as a Long Term Evolution (LTE) network, WiMAX network, 3G network, etc. The network 820 may include a local or private network or may include a wide network such as the internet. Devices may be connected to the network 820 through either wired or wireless connections.

The device 102 includes input/output device interfaces 910. A variety of components may be connected through the input/output device interfaces 910, such as a display or display screen (not shown), which may have a touch surface or touchscreen. However, the disclosure is not limited thereto and the device 102 may not include an integrated touchscreen or display. Thus, the display and other components may be integrated into the device 102 or may be separate without departing from the disclosure. If included, the display may be a video output device for displaying images. The display may be a display of any suitable technology, such as a liquid crystal display, an organic light emitting diode display, electrophoretic display, electrowetting display, an electrochromic display, a cathode ray tube display, a pico projector or other suitable component(s). The display may also be implemented as a touchscreen.

The input/output device interfaces 910 may also include an interface for an external peripheral device connection such as universal serial bus (USB), FireWire, Thunderbolt, Ethernet port or other connection protocol that may connect to networks 9820. The input/output device interfaces 910 may also include a connection to an antenna (not shown) to connect one or more networks 9820 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 further includes a transmission module 924, which may comprise processor-executable instructions stored in storage 908 to be executed by controller(s)/processor(s) 904 (e.g., software, firmware), hardware, or some combination thereof. For example, components of the transmission module 924 may be part of a software application running in the foreground and/or background on the device 102. The transmission module 924 may control the device 102 as discussed above, for example with regard to FIGS. 1, 6A-6E, and/or 7A-7B. Some or all of the controllers/modules of the transmission module 924 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

Executable instructions for operating the device 102 and its various components may be executed by the controller(s)/processor(s) 904, using the memory 906 as temporary "working" storage at runtime. The executable instructions may be stored in a non-transitory manner in non-volatile memory 906, storage 908, or an external device. Alternatively, some or all of the executable instructions may be embedded in hardware or firmware in addition to or instead of software.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    transmitting, by a first device, a first capability message at a first transmission power, the first capability message indicating an ability by the first device to relay data;
    determining a first processing load of the first device;
    receiving, by the first device, a request from a client device to relay data packets between the client device and a network device;
    relaying, by the first device, data packets between the client device and the network device, resulting in a second processing load imposed on the first device;
    determining a first value corresponding to a sum of the first processing load and the second processing load;
    determining that the first value exceeds a first threshold value;
    determining a second transmission power using the first value, the second transmission power lower than the first transmission power; and
    transmitting, by the first device, a second capability message at the second transmission power.

2. The computer-implemented method of claim 1, further comprising:
    determining, at a first time subsequent to transmitting the second capability message, that the first value is below the first threshold value; and
    transmitting, at a second time subsequent to the first time, a third capability message at the first transmission power.

3. The computer-implemented method of claim 1, wherein the first processing load is a local throughput associated with the first device, the local throughput including data packets that are not wirelessly relayed by the first device, the method further comprising:
    determining, at a first time subsequent to transmitting the second capability message, that the local throughput is below the first threshold value; and
    transmitting, at a second time subsequent to the first time, a third capability message at the first transmission power.

4. The computer-implemented method of claim 1, wherein the determining the first processing load further comprises:
    determining at least one of a first throughput of data to the first device and first processing usage of the first device, the first throughput of data indicating an amount of data packets that are not wirelessly relayed by the first device, the first processing usage indicating an amount of processing power of the first device that is associated with the first throughput of data, and the method further comprises:
    determining the second processing load, wherein determining the second processing load comprises determining at least one of a second throughput of relayed data and a second processing usage of the first device, the second throughput of relayed data indicating an amount of data packets wirelessly relayed by the first device, the second processing usage indicating an amount of processing power of the first device that is associated with the second throughput of relayed data packets.

5. A computer-implemented method, the method comprising:
    transmitting, by a first device, a first capability message at a first transmission power, the first capability message indicating an ability by the first device to relay data;
    determining a first processing load of the first device;
    receiving, by the first device, a request from a client device to relay data packets between the client device and a network device; and
    relaying, by the first device, data packets between the client device and the network device, resulting in a second processing load imposed on the first device
    determining a first value corresponding to a sum of the first processing load and the second processing load;
    determining that the first value exceeds a first threshold value;
    sending, by the first device, a request to the client device requesting the client device to send signal strength data;
    receiving, by the first device, the signal strength data from the client device, the signal strength data including a first signal strength of a signal from the first device and a second signal strength of a signal from the network device;
    determining a difference between the first signal strength and the second signal strength
    determining a second transmission power by subtracting at least the difference from the first transmission power, the second transmission power lower than the first transmission power; and
    transmitting, by the first device, a second capability message at the second transmission power.

6. A computer-implemented method, the method comprising:
    transmitting, by a first device, a first capability message at a first transmission power, the first capability message indicating an ability by the first device to relay data;
    determining a first processing load of the first device;

receiving, by the first device, a request from a client device to relay data packets between the client device and a network device;

relaying, by the first device, data packets between the client device and the network device, resulting in a second processing load imposed on the first device;

receiving, by the first device, a second request from a second client device to relay data packets between the second client device and the network device;

relaying, by the first device, data packets between the second client device and the network device, resulting in a third processing load of the first device;

determining that the second processing load is below a second threshold value, the second threshold value indicating that a processing load consumes a significant portion of available processing of the first device;

determining that the third processing load exceeds the second threshold value;

determining a second transmission power, the second transmission power lower than the first transmission power;

transmitting, by the first device, a second capability message at the first transmission power to the client device; and transmitting, by the first device, a third capability message at the second transmission power to the second client device.

7. A device, comprising:

at least one processor;

a memory device including instructions operable to be executed by the at least one processor to configure the device for:

transmitting a first capability message at a first transmission power, the first capability message indicating an ability by the first device to relay data;

determining a first processing load of the device, wherein determining the first processing load further comprises determining at least one of a first throughput of data to the device and first processing usage of the device, the first throughput of data indicating an amount of data packets that are not wirelessly relayed by the device, the first processing usage indicating an amount of processing power of the device that is associated with the first throughput of data;

receiving, by the device, a request from a client device to relay data packets between the client device and a network device;

relaying data packets between the client device and the network device, resulting in a second processing load imposed on the device;

determining the second processing load, wherein determining the second processing load comprises determining at least one of a second throughput of relayed data packets and a second processing usage of the device, the second throughput of relayed data indicating an amount of data packets wirelessly relayed by the device, the second processing usage indicating an amount of processing power of the device that is associated with the second throughput of relayed data packets;

determining that a sum of the first processing load and the second processing load exceeds a first threshold value;

determining a second transmission power, the second transmission power lower than the first transmission power; and transmitting a second capability message at the second transmission power.

8. The device of claim 7, wherein the instructions further configure the device for:

determining, at a first time subsequent to transmitting the second capability message, that the first processing load is below the first threshold value; and transmitting, at a second time subsequent to the first time, a third capability message at the first transmission power.

9. The device of claim 7, wherein the first processing load is a local throughput associated with the device, the local throughput including data packets that are not wirelessly relayed by the device, and wherein the instructions further configure the device for:

determining, at a first time subsequent to transmitting the second capability message, that the local throughput is below the first threshold value; and transmitting, at a second time subsequent to the first time, a third capability message at the first transmission power.

10. The device of claim 7, wherein the instructions further configure the device for:

determining a first value corresponding to the first processing load;

determining a third transmission power using the first value;

determining a second value corresponding to an updated processing load, wherein the second value is greater than the first value; and determining the second transmission power using the second value, the second transmission power less than the third transmission power.

11. The device of claim 7, wherein the instructions further configure the device for:

sending a request to the client device requesting the client device to send signal strength data;

receiving, by the device, the signal strength data from the client device, the signal strength data including a first signal strength of the device and a second signal strength of the network device;

determining a difference between the first signal strength and the second signal strength; and determining the second transmission power by subtracting at least the difference from the first transmission power.

12. The device of claim 7, wherein the instructions further configure the device for:

receiving, by the device, a second request from a second client device to relay data packets between the second client device and the network device;

relaying data packets between the second client device and the network device, resulting in a third processing load of the device;

determining that the second processing load is below a second threshold value;

determining that the third processing load exceeds the second threshold value, the second threshold value indicating that a processing load consumes a significant portion of available processing of the device;

transmitting a third capability message at the first transmission power to the client device; and transmitting a fourth capability message at the second transmission power to the second client device.

13. The device of claim 7, wherein the instructions further configure the device for, after relaying the data packets:

sending a disconnect message to the client device, the disconnect message instructing the client device to disconnect from the device; and selecting the second transmission power such that the client device connects directly to the network device.

14. The device of claim 13, wherein the instructions further configure the device for, prior to sending the disconnect message:

determining that the second processing load exceeds a second threshold value.

15. A computer-implemented method, the method comprising:

transmitting, by a first device, a first capability message at a first transmission power, the first capability message indicating an ability by the first device to relay data;

receiving, by the first device, a request from a client device to relay data packets between the client device and a network device;

relaying, by the first device, data packets between the client device and the network device;

determining a first processing load of the first device;

determining that the first processing load exceeds a first threshold value;

sending a disconnect message to the client device, the disconnect message instructing the client device to disconnect from the device;

determining a second transmission power such that the client device connects directly to the network device, the second transmission power lower than the first transmission power; and transmitting, by the first device, a second capability message at the second transmission power.

16. The computer-implemented method of claim 15, further comprising, prior to sending the disconnect message:

determining that the second processing load exceeds a second threshold value.

\* \* \* \* \*